PHASE SHIFT FREQUENCY
RESPONSE OF DELAY LINE
(BAND PASS)

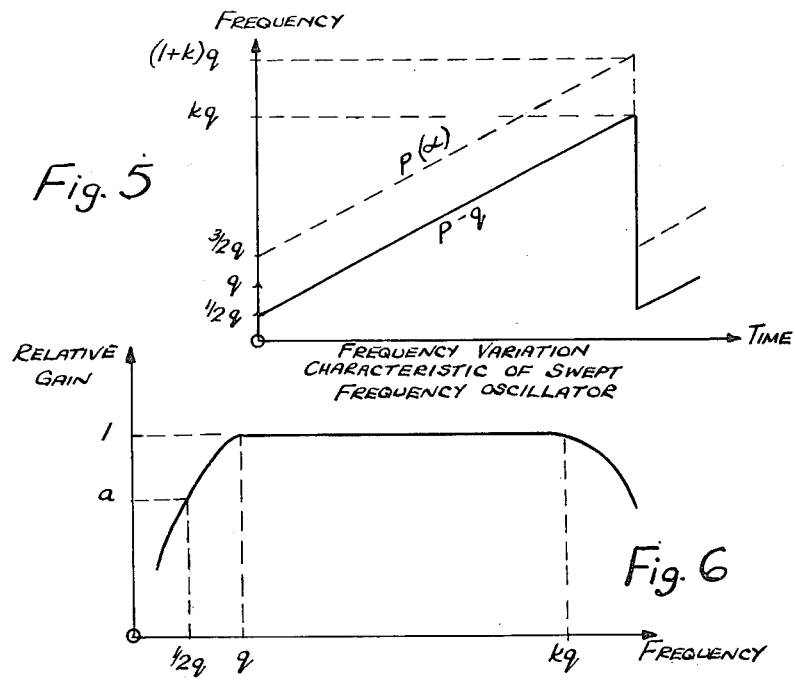
Fig. 5
Frequency Variation Characteristic of Swept Frequency Oscillator
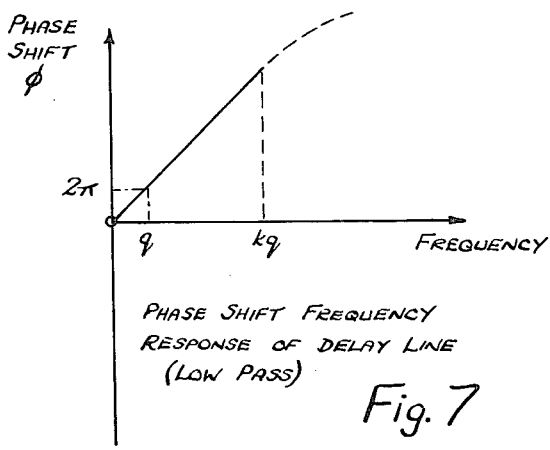
Fig. 6
Fig. 7
Phase Shift Frequency Response of Delay Line (Low Pass)

DIRECTIONAL PATTERN OF TRANSDUCER ARRAY

3,092,802
METHOD OF AND APPARATUS FOR ACOUSTIC POSITION FINDING
David Gordon Tucker, Barnt Green, England, assignor to National Research Development Corporation, London, England, a British corporation
Filed May 16, 1957, Ser. No. 659,691
Claims priority, application Great Britain May 16, 1956
21 Claims. (Cl. 340—3)

This invention relates to a method of and apparatus for position finding utilizing pulses of wave energy, such as, for example, acoustic wave energy.

The term "acoustic" is to be deemed to include sound waves of any frequency whether above, within or below the audible range.

The specific embodiment of the invention described herein relates to a method of and apparatus for acoustic position finding wherein a series of time-spaced sound pulses is emitted so as to travel from a transmitting station through a target containing medium and return after reflection by a target to a receiving station at which the reflected pulses are received at a beam-forming transducer array and are thereafter displayed on or in relation to a range time base synchronised with emission of the transmitted pulses to provide range determination of the target.

The term "beam" employed herein in relation to a receiving transducer array is used to denote that such array has a sensitivity which varies within a reference plane in such a manner that the sensitivity is a maximum in a particular direction, which conveniently may be defined by a reference axis in such plane and which reduces to zero or a minimum value at positions spaced angularly from said reference axis there being one or more such positions on each side thereof. As a matter of convenience and not in a limiting sense the expression "beam width" used herein denotes the angular separation between those positions at which the output amplitude from the transducer array is 3 decibels below the output amplitude produced by a signal of the same strength from a source disposed on the reference axis. It will of course be understood that in the case of a receiving transducer array the "beam" exists only as a graphical conception conveniently represented by the polar diagram representing the sensitivity of the array as a function of angular displacement from the reference axis, whereas in the case of a transmitting transducer array the "beam" has some real physical existence in as much as the intensity or field strength of the signals emitted by the array is at a maximum on the reference axis and decreases on each side thereof falling to a level of 3 decibels below the maximum at the limits of the "beam width" as herein defined.

An acoustic position finding method of the kind hereinbefore specified is known wherein the exploration of a sector of the target containing medium in which a target may be disposed is performed by mechanical angular displacement of the beam forming transducer array, such angular displacement being performed stepwise over the sector to be explored with a sufficient dwell in each position to permit pulse reflections to be received in that position of parent transmitted pulses from a target at the extreme range at which the apparatus for performing this method is designed to operate. One of the disadvantages of this method is that the exploration of the whole sector takes some appreciable time, and in applications of the method where the targets are moving, detection of these may fail to take place because of movement out of the explored area before the beam of the receiving transducer array is directed towards the particular position within the sector temporarily occupied by the target.

One object of the present invention is to provide a new or improved method of acoustic position finding of the kind specified which minimises the risk of losing targets without detection from an explored sector and which can be carried out without an unacceptably high degree of complication as to the apparatus required.

From one aspect the invention resides in the provision of a method of acoustic position finding of the kind specified characterized in that the beam is caused to execute one or more scanning sweeps each of continuous movement covering a sector to be explored such sweep or such sweeps collectively being executed within a time interval equal to the transmitted pulse duration starting at an appropriate time in relation to the emission of a particular transmitted pulse and repeated for a sufficient proportion of the interpulse interval to provide for reception of signals reflected from any target within the limit of the range required, the beam width being sufficiently small to reduce the received pulse duration to a value providing discrimination as to the period of reception within any scanning sweep, and a further time base swept in conformity with the scanning sweep of the beam is utilized in association with the display of the received pulses to provide determination of target direction.

The beam of the receiving transducer may be caused to execute said scanning sweeps by combining the outputs from respective transducer elements, which are spaced apart in a direction generally parallel to the plane of scan, after passage through phase-shift elements capable of producing a phase shift of the signal passing therethrough, which phase-shift is variable in magnitude in response to a change in some electrical condition of operation of the phase-shift elements, so that for a particular electrical condition of operation the combined outputs from the respective transducer elements provide maximum amplitude of signal for a particular beam position in relation to the reference axis of the transducer array, and subjecting the phase-shift elements to variation in said electrical condition of operation thereby producing change of magnitude of the phase shift in the signal passing through each such element and thereby producing a scanning sweep of the beam.

This form of the method may be carried out in a particularly simple and convenient manner by combining the outputs from respective transducer elements by feeding them to respective consecutive sections of a delay line and taking the combined output from one or both ends thereof, the overall phase-shift produced along the length of the delay line being varied by subjecting it to said variable electrical condition of operation.

It will be understood that it is within the scope of the invention to employ various types of change in electrical conditions of operation suitable for producing a variation in the phase-shift of the signals passing through the phase shift elements. For example the phase shift elements may include inductive components having magnetic saturable cores and the variable electrical condition of operation may be constituted by variation of a polarizing electrical current, for example a direct current the value of which determines the effective inductance of each of these inductive components. Another possible alternative would be to employ thermionic valves in each of the phase shift elements connected as reactance valves in a suitable circuit, the reactance being capable of variation by the application of a suitable voltage varying as a function of time to these circuits.

Preferably, however, variation of the phase-shift is obtained by utilization of frequency sensitive phase-shift elements and by modulating the outputs from the respective transducer elements with a locally generated variable frequency signal and extracting a single side-band of the resultant modulated carrier for feeding to respective sections of the delay line. The term "frequency sensitive" is used herein to mean that the phase shift produced varies as a function of the frequency of the signal passing therethrough. Preferably but not essentially the phase-shift is a substantially straight line function of the frequency.

The invention further relates to acoustic position finding apparatus comprising a transmitter adapted to emit a series of time spaced sound pulses through a target containing medium and a receiver having a beam-forming transducer array with which is associated an amplifier means and a display device for displaying pulses received as reflections from a target, such display being effected on or in association with a range time base synchronized with the emission of transmitted pulses to provide range determination of the target.

Thus in accordance with a further aspect of the invention there is provided acoustic position finding apparatus of the kind specified characterized in that the beam of the receiver transducer array is caused to execute one or more scanning sweeps of a sector to be explored within a time interval equal to the transmitted pulse duration by the provision of variable phase shift elements connected respectively to transducer elements of the array spaced apart in a direction generally parallel to the plane of scan and connected to the amplifier means to provide a combined input thereto which has a maximum amplitude for a particular phase difference between signals received respectively by the transducer elements so as to be characteristic of a particular beam position in relation to a reference axis of the transducer array, and by the provision of means for varying over the duration of each scanning sweep required the phase-shift produced by each of said phase-shift elements in a manner so coordinated as to swing the beam angularly in the plane of scan in relation to the reference axis, the transducer array providing sufficiently small beam width to reduce the received pulse duration to a value providing discrimination as to its period of reception within any scanning sweep, and the display device including a beam position indicating means and a signal reception indicating means operable in coordination to provide indication of the position or positions occupied by the beam upon occurrence of signal reception.

The phase shift elements may be constituted by consecutive sections of a delay line and the receiver amplifier means may be fed from one or both ends of such line which is so constructed or made up as to permit of the overall phase shift produced along its length being capable of variation in response to change in some electrical condition of operation thereof, and means being provided to subject the delay line to such variation over the duration of each scanning sweep required so as to produce a scanning sweep of the beam.

The delay line may have a phase-shift characteristic which is variable as a function of the frequency of the signal applied thereto and the means for subjecting the delay line to said variation in the electrical condition of operation may comprise modulator means adapted to receive signals from respective transducer elements of the receiving array and signals from a local frequency-swept oscillator and means for extracting a single sideband from the resultant modulated carrier for application to respective sections of the delay line.

The invention will now be described by way of example with reference to the accompanying drawings wherein:

FIGURE 5 is a graph illustrating the frequency variation of the locally generated signal produced by the circuit illustrated in FIGURE 3 and the relationship of this frequency with the carrier frequency of the incoming signal.

FIGURE 6 is a graph illustrating the gain characteristics of the A.G.C. amplifiers in the channels from respective ends of the delay line to the control grids of the cathode ray tube as shown in FIGURE 1.

FIGURE 7 is a graph illustrating the phase-shift/frequency characteristic of the delay line illustrated in FIGURE 4.

Figure 1:
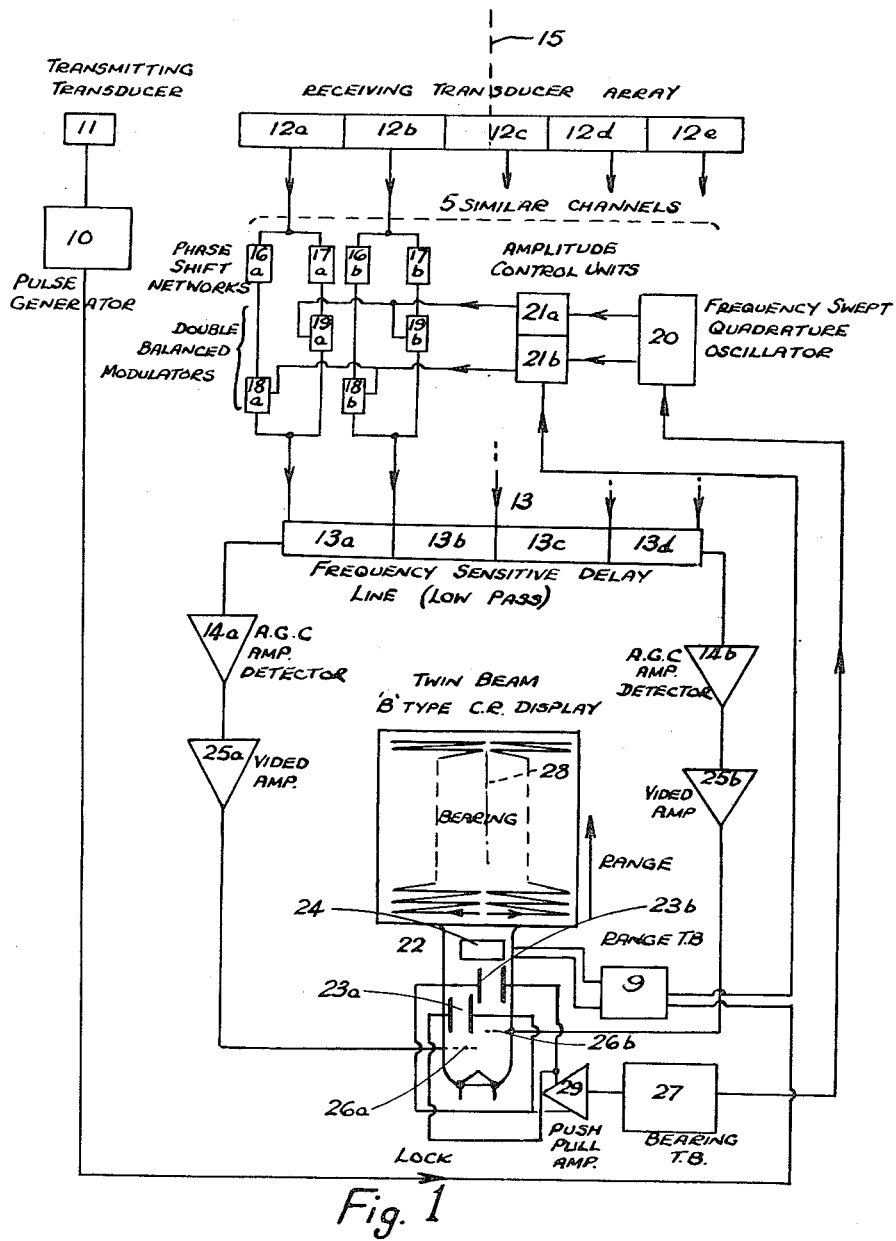
FIGURE 1 is a schematic diagram illustrating the general arrangement of one form of acoustic position finding apparatus in accordance with the invention for carrying out the method thereof.
Figure 8:
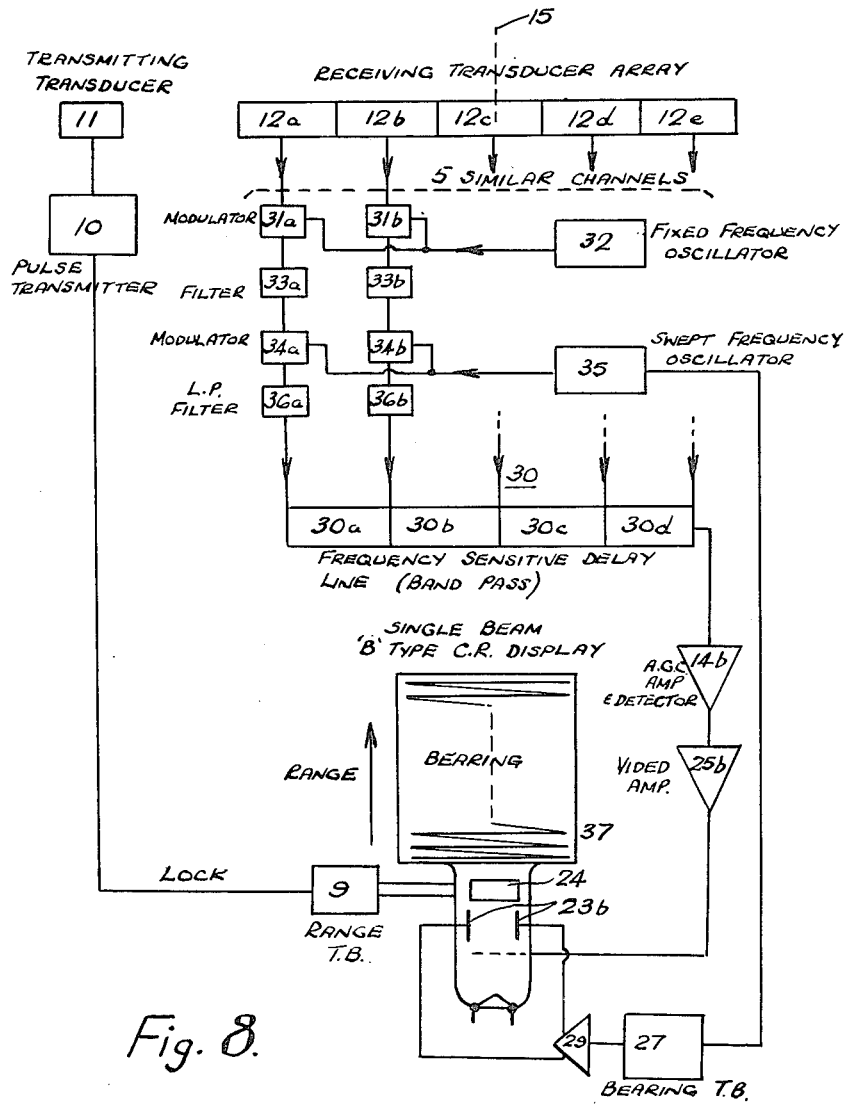

FIGURE 8 is a schematic diagram similar to FIGURE 1 but showing an alternative form of apparatus in accordance with the invention for carrying out the method thereof utilizing a single beam cathode ray tube display, a different form of delay line permitting of signal extraction from one end only thereof and alternative arrangements for modulating the incoming signals and extracting single side-bands from the resultant modulated carriers.

Figure 9:
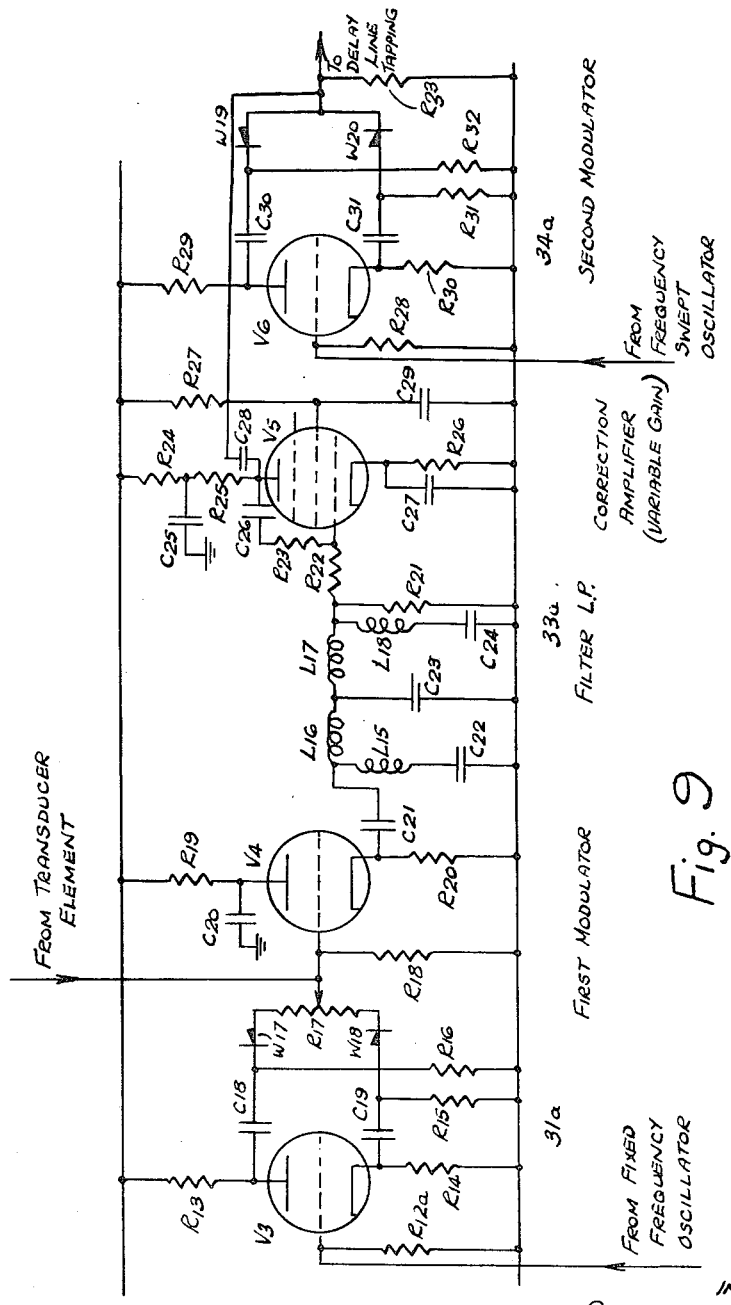

FIGURE 9 is a circuit diagram of one of the channels connecting an element of the receiving transducer array with a tapping point on the delay line and incorporating two modulators and a filter all connected in a series with each other.

Figure 10:
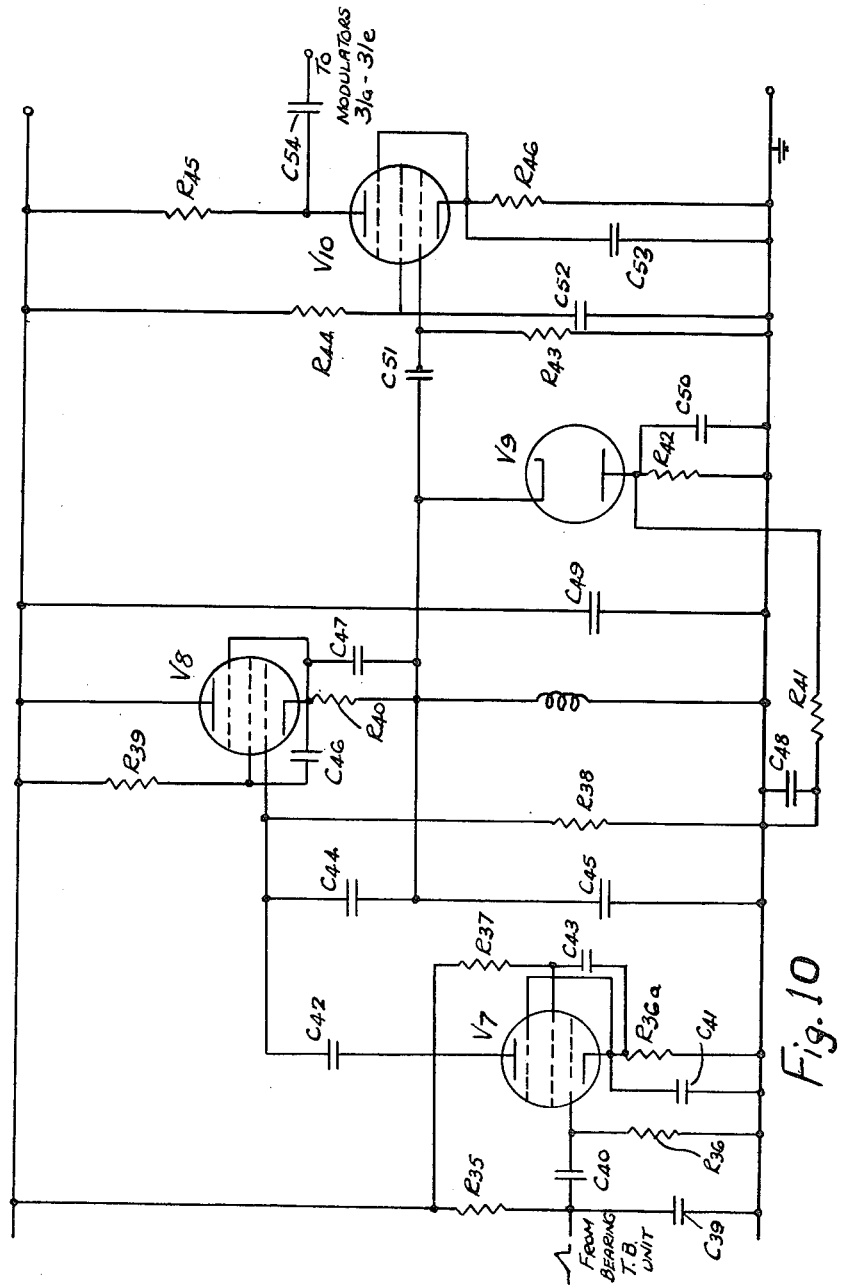

FIGURE 10 is a circuit diagram of the swept frequency oscillator feeding the second of the modulators shown in FIGURE 9.

Figure 11:
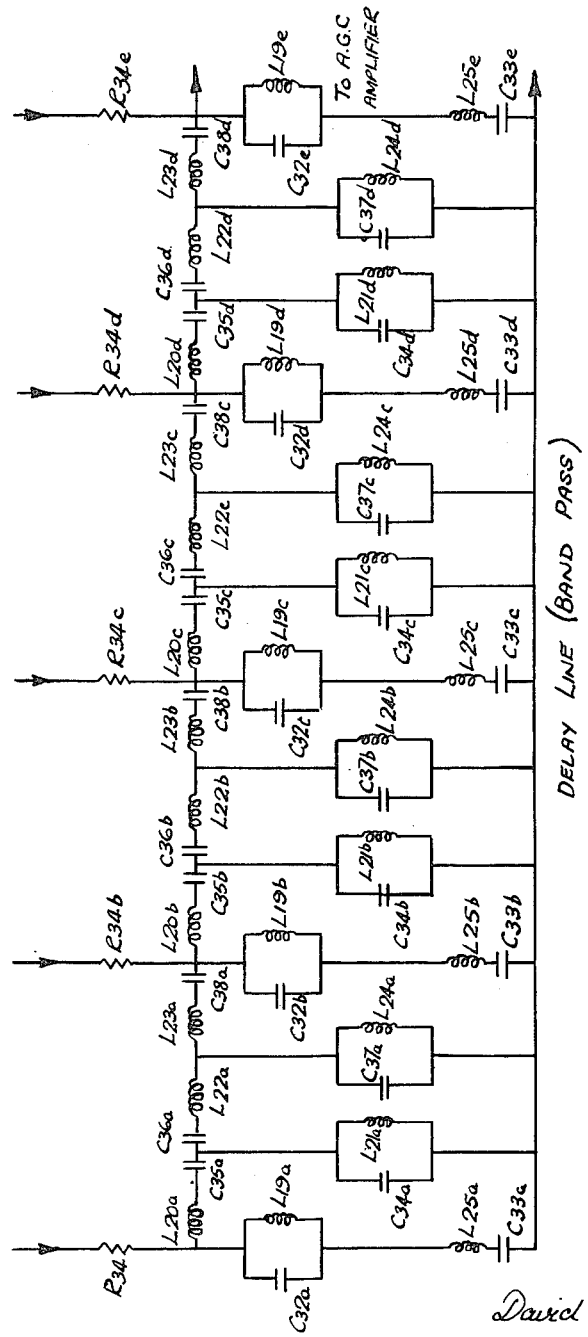

FIGURE 11 is a circuit of a delay line suitable for employment in the apparatus illustrated in FIGURE 8.

Figure 12:
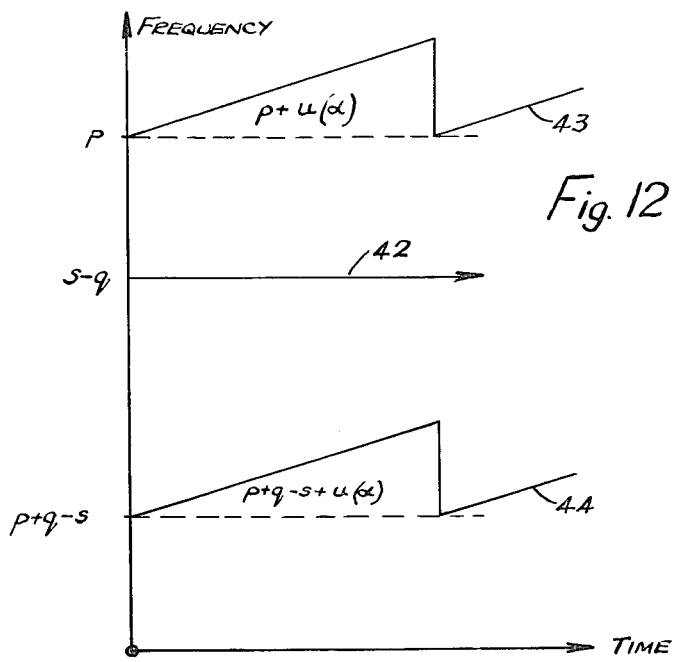

FIGURE 12 is a graph illustrating the relationship between the carrier frequency of the received signal, the fixed frequency of the oscillator feeding the first modulator of the circuit shown in FIGURE 9 and the swept frequency feeding the second modulator thereof.

Figure 13:
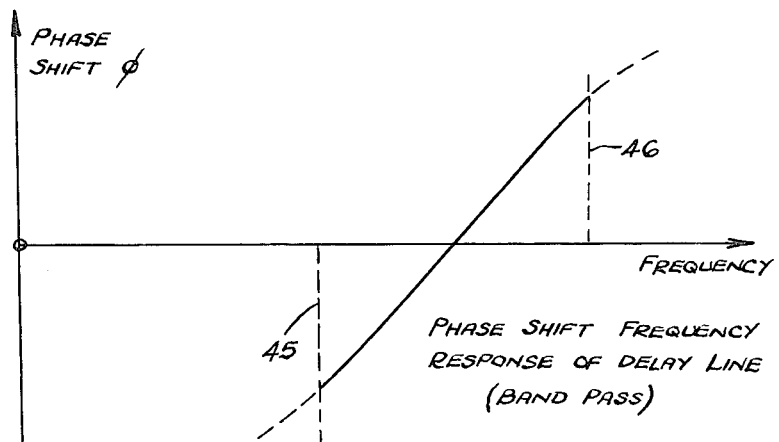

FIGURE 13 is a graph showing the phase shift/frequency characteristic of the delay line of FIGURE 11.

Figure 14:
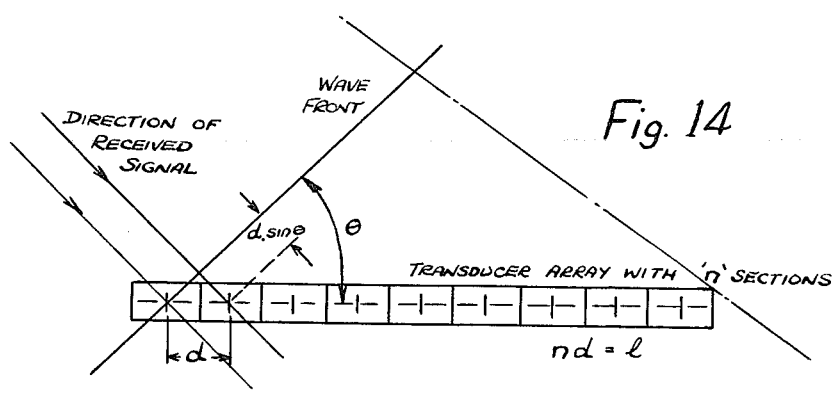
Figure 15:
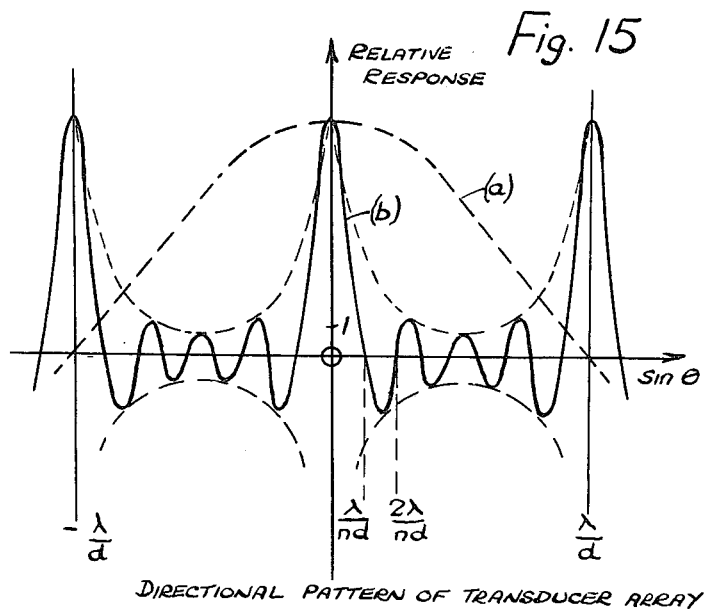

FIGURE 14 is a diagram illustrating the reception of the receiving transducer array of a wave front oblique to such array and proceeding from a target offset from the reference axis of such array and FIGURE 15 is a graph illustrating the sensitivity of a single transducer element as a function of angular displacement of signal source from the reference axis and sensitivity of the complete array as a function of angular displacent from the reference axis, assuming each individual element to have uniform or non-directional sensitivity.

In the following description a general explanation of the manner of operation and identity of the main components of the two forms of apparatus illustrated in FIGURES 1 and 8 will first be given, the components thereafter being described in greater detail with particular reference to the considerations which determine their particular forms and operating characteristics.

Firstly it will be understood that the forms of apparatus illustrated in FIGURES 1 and 8 may be utilized for a variety of purposes wherein it is desired to determine the position of a target in a surrounding sound transmitting medium, a particular example being the position determination of under-water objects such as ships, shoals of fish or even individual fish, and under-water formations such as the sea bed or obstructions thereon. The method may, however, be applied in other fields where for example the target containing medium is not necessarily a liquid, it could for example be a gas such as air or of solid form. In the former case the method would be used for position determination of objects on the ground or above ground and in the latter case it would be used for examination or survey of under-ground formations in which case the target would be constituted by some object or mass affording a different acoustic impedance to that afforded by the surrounding ground material. Possibly in this field the method may be used in connection with the position determination of underground liquid deposits such as water or oil, or the detection of flaws or faults in structurees or members of solid material, such for example as in ingots or other cast members.

In each of the two forms of apparatus a means is provided for emitting a series of time spaced pulses of sound waves which may be above, below, or within the audible range such transmitting means comprising a pulse generator 10 the output of which is fed as shown to a transmitting transducer 11 and which is also connected by a locking line to synchronize time base unit 9 forming part of the display device of the receiver means.

The receiver means which is adapted to receive the emitted pulses as reflections from a target comprises a beam-forming receiving transducer array which typically is shown as having five transducer elements 12a to 12e inclusive. This transducer array may be in the form of a strip producing a fan-shaped beam which it is required to swing in a scanning plane perpendicular to the plane of the beam itself and in which scanning plane the transducer elements 12a to 12e inclusive lie. The considerations governing selection as to the number of transducer elements are hereinafter set forth.

The beam produced by the array 12a to 12e will normally be coincident with a reference axis 15 and consequently signals received from a target on this reference axis by the respective transducer elements will be in phase with each other. Deflection of the beam to one side or the other of the reference axis is, however, contrived by applying to each of the signals received from the respective transducer elements 12a to 12e inclusive a phase-shift before the signals are combined with each other the phase-shift applied to the signals from consecutive elements 12a to 12e inclusive being conveniently but not essentially such that there is an equal phase difference of the same sign between the signal received from each element and the signal received from the element at the right hand side thereof as seen in FIGURE 1. This is done by feeding the signals from the respective elements 12a to 12d inclusive to tapping points at the left hand ends of respective sections 13a to 13d inclusive of a delay line 13, that from the section 12e being fed to the right hand end of the section 13e of the delay line. Thus the output taken from the left hand end of the delay line 13 to an automatic gain control amplifier 14a will have maximum amplitude when the phase difference between the signals received at the transducer elements 12a to 12e inclusive is exactly offset by the phase shift imparted to the signals by passage through the sections of the delay line 13. It will be evident that the signal from the element 12b will traverse only the section 13a of the delay line 13 whereas the signal from the element 12c will traverse sections 13a and 13b of the delay line and will therefore undergo a greater (for example twice), phase shift in the delay line. The particular phase shift produced by passage of the signal components from the transducer elements 12a to 12e through the delay line 13 to the amplifier 14a will thus correspond to a particular beam deflection to the right of the reference axis 15 since the wave front must arrive at the element 12a somewhat later than the time of its arrival at the element 12e for the delay line to produce an exact compensation.

Similarly the combined signal extracted from the right hand end of the delay line and applied to the automatic gain control amplifier (c) will be at a maximum when the target producing the signal is offset to the left of the reference axis 15 so that the beam is thus deflected angularly to the left in this case.

In order to scan a sector to be explored disposed symmetrically in relation to the reference axis 15 and having, as hereinafter explained, an angular width equal to the product of the beam width and the number of transducer elements, or approximately so, the apparatus incorporates means for varying in a continuous manner with respect to time the phase-shift produced in the delay line through each of the sections 13a to 13d without changing the phase difference between signals fed into the delay line 13 at consecutive tapping points.

These means take one form in the apparatus illustrated in FIGURE 1 and another form in the apparatus illustrated in FIGURE 8.

In FIGURE 1 the signals fed out from each of the transducer elements 12a to 12e are passed through channels each containing two branches 16 and 17 in which are connected respectively a phase shift network indicated at 16a, 16b etc. and a phase shift network indicated at 17a, 17b etc. The phase shift networks 16a, 16b etc. are adapted to produce a phase shift of $+45°$ whilst the phase shift networks 17a, 17b etc. are adapted to produce a phase shift of $-45°$.

The two branches of the channels further contain modulator circuits 18a, 18b etc. and 19a, 19b etc. The modulator circuits 18a and 18b etc. and 19a and 19b etc. are fed respectively from a frequency swept oscillator 20 providing two outputs in quadrature with each other through the intermediary of amplitude control units 21a and 21b and the resultant product signals fed from the outputs of the modulator circuits in any one channel, for example 18a and 19a are added to provide a modulator of varying frequency (the range of frequency being determined by the frequency swept oscillator) with single side-band modulation the phase difference between the signals fed in to the phase shift networks 16a, 17a etc. on the other hand being preserved.

The delay line 13 is composed of components which provide a phase shift/frequency characteristic such that the phase shift produced along the line varies, conveniently but not essentially as a substantially straight-line function of the frequency so that the beam position as "seen" at the output from either end of the line occupies a position dependent at any particular instant upon the frequency of the output of the frequency-swept oscillator.

The sweep characteristic of this oscillator is arranged to be of saw tooth form so that there is a continuous movement of the transducer array beam over the sector to be scanned, such movement being of approximately constant angular velocity in the case where rectilinear saw tooth frequency sweep characteristic is afforded by the oscillator 20 and the delay line also affords a substantially straight line relation between phase-shift and frequency.

Display of signals received by the transducer array and fed out from both ends of the delay line 13 is effected upon a cathode ray tube arranged to provide what is commonly termed a B-type display. In the particular arrangement of FIGURE 1 a twin-beam cathode ray tube 22 is employed having two pairs of plates 23a and 23b producing deflections of respective beams in the X direction utilized as a Cartesian coordinate representing angular displacement of the beam, and a single pair of plates 24 for deflection in the Y direction utilized for range measurement.

The outputs from the amplifiers 14a and 14b are fed through video amplifiers 25a and 25b to respective control grids 26a and 26b pertaining to the respective beams of the tube 22. The amplifiers 14a and 14b incorporate detector circuits.

Respective pairs of plate 23a and 23b are fed from a push-pull amplifier 29 which is in turn fed from the output of a bearing time base unit 27 which provides a similar suitably synchronized and phased saw tooth output for both the pairs of plates 23a and 23b of the tube 22 and also the swept-frequency oscillator so that the positions occupied by the two scanning beams of the tube 22 correspond at any instant to a particular frequency of the oscillator 20 and hence to a particular angular displacement of the transducer beam from the reference axis 15, whereby it will be evident that the twin beams of the tube 22 and the beam of the transducer array seen respectively in the left hand end of the delay line and the right hand end of the delay line at any instant occupy corresponding positions along their respective paths of sweep.

The twin beams of the tube 22 however, are also deflected in the Y- or range-direction at a speed which will result in completion of a frame-scan of the tube 22 in the interval between the emission of one transmitted pulse and the succeeding transmitted pulse.

Assuming therefore that both the range and bearing time base are initiated by the leading edge of a transmitted pulse, the first X, or beam direction, scan of the cathode ray tube beams and the first scanning sweep of the transducer beam for the reference axis to the extreme left of the scan section (as seen from the right hand end of the delay line 13) or the extreme right of the sector (as seen from the left hand end of the delay line) will take place in a time determined by the duration of the first saw tooth of the bearing time base unit output which in practice have not more than and conveniently is made equal to the duration of the emitted pulse. In practice the bearing saw tooth would be of slightly less duration than the transmitted pulse so as to provide for fly-back of each of the twin beams of the tube 22 to the central axis of symmetry 28 on which the two scanning rasters meet.

As a possible alternative the duration of each saw tooth output produced by the bearing time base may be such that the bearing scan on the cathode ray tube, and a transducer beam scan, are completed a greater number of times, for example 2, 3 or 4 during the emission of each transmitted pulse.

The effect of this would be to provide a corresponding number of successive discrete signals (each being a sample of the reflected pulse) such signals appearing at the ends of the delay line 13 and being applied after passage through the units 14a, 14b, and 25a, 25b to the control grids 26a, 26b. These signals would all be contained within a time interval equal to the duration of the transmitted pulse so that neither range nor bearing discrimination would be impaired.

The scanning operation of the transducer beam and the cathode ray tube beams are performed continuously and thus continue into the inter-pulse interval. In practice the scanning continues for the whole of the inter-pulse interval but it could if desired be discontinued after a proportion of the interpulse interval determined by the maximum range from which signals are required to be reflected. It will therefore be evident that received signals fed from both ends of the delay line 13 to the control grids 26a and 26b will cause brightening of the spot produced on the screen of the tube 22 at a position which determines both the range and the direction of the target producing such spot brightening.

Since the transducer beam sweeps the sector typically in a time substantially equal to that of the transmitted pulse, it follows that the beam width, being narrower than the sector to be scanned, will receive only a vertical section or sample of the pulse reflected from any target, the width of this section or sample being dependent upon the beam width which is thus made sufficiently small to provide discrimination of the required order as to target direction on the display produced on the screen of the cathode ray tube 22.

In the alternative form of apparatus illustrated in FIGURE 8 certain components thereof may be substantially identical in form and manner of operation with those of the apparatus illustrated in FIGURE 1 and these have been indicated by like numerals of reference.

In principle the manner of operation of the apparatus shown in FIGURE 8 is similar to that of FIGURE 1 the two main differences being that output is taken from only one end of the delay line 30 consisting of sections 30a to 30d inclusive, the delay line being composed of components which in response to frequency change of the signals applied to the delay line will provide phase-shift range from a negative value through zero to a positive value and thereby correspond to a complete swinging of the transducer beam from the left hand side of the scanned sector to the right hand side.

The other main difference is the manner in which a single side-band of a frequency swept carrier is obtained for feeding to the tapping points of the delay line 30 in each of the channels connecting the transducer elements 12a to 12e thereto.

Referring to this last mentioned difference more specifically frequency conversion of the carrier of the received signal is effected in two stages, each stage consisting of a modulator and a filter. Thus in each of the five channels there are provided modulators 31a, 31b etc. fed with signals from respective transducer elements and with a signal from a common fixed-frequency oscillator 32.

The resultant product is passed through filters 33a, 33b etc. which pass sum frequencies of the two carriers and stop difference frequencies, all carrier leaks, and side-bands and harmonics of the carrier generated by the oscillator 32.

The second or further modulator in each channel as indicated at 34a, 34b etc. is fed with the sum frequency and an output from a swept frequency oscillator 35, the resultant product signals being passed through low pass filters 36a, 36b, etc. which pass only the difference frequency and stop all higher frequencies. In some cases the filters 36a, 36b as separate entities may be dispensed with and their functions performed by the delay line itself.

In consequence of utilizing output from the delay line 30 from one end only thereof it is no longer necessary to use a twin beam cathode ray tube and a single beam tube 37 is employed wherein as before the output from the bearing time base 27 is applied to plates 23 producing deflection in the X direction to provide beam deflection as a Cartesian coordinate and the output from a range time base 12 is applied to plates 24 producing deflection in the Y direction to give range again as a Cartesian coordinate.

The saw-tooth wave form produced by the bearing time base is utilized to control the frequency sweep of oscillator 35 and thereby again produce correspondence between transducer and cathode ray tube beam position so that the brightening of the cathode ray tube spot to produce a signal will result in such signal appearing at a position on the cathode ray tube face corresponding to the position of the target in the sector explored by scanning of the transducer beam.

Referring now specifically to the particular forms and operating characteristics of the main components hereinbefore described the pulse transmitter 10 for producing a time-spaced series of sound pulses may comprise any suitable form of thermionic valve or other type of pulse generator, the detailed circuit of which does not form part of the present invention.

The design of such generators is dealt with in the book "Waveforms" (vol. 19 of Radiation Laboratories Series) section 4.13 published by McGraw-Hill Book Co., Inc. to which reference may be had for further details.

It is indicated by way of example that a carrier frequency for the sound waves to be emitted of 50 kc./s. may be employed the pulse duration being typically 1000 microseconds and a repetition frequency of about 1 pulse per second provide for the reception of reflected signals from targets submerged in water up to an extreme range of about 800 yards.

These figures are given as typical of those which may be utilized in practice and it is to be understood that they do not limit the scope of the invention which is hereafter defined in the claims.

The transmitting transducer 11 may likewise be of known form. Any one of the three main types namely magnetostriction, piezoelectric, or electrostriction (for example barium titanate may be used). Further details relating to these devices may be obtained by reference to publications of which the following are typical:

(1) "Ultra-sonic Engineering" by A. E. Crawford, published by Butterworth & Co., London, 1955.

(2) "Fundamentals of Electro-Acoustics" by F. A. Fischer (translated by S. Ehrlich and F. Pordes) published by Interscience Publishers, New York, 1955.

(3) "Quartz Vibrators," by P. Vigoureux and C. F. Booth, published by H.M. Stationery Office, London, 1950.

Ideally the energization of the sector to be explored in consequence of the emission of the transmitted pulses should be uniform throughout the sector and fall to zero or a low value at the boundaries, but this condition is not capable of exact attainment.

However, it is preferred not to use a transmitting transducer element which would operate in effect as a point source and thus produce all round emission because this would produce undesirable ambiguities, arising from the existence of side lobes in the polar diagram afforded by the receiving transducer array, and in practice the transmitting transducer may consist of a strip array of transducer elements with an excitation related to the distance $x$ from the centre of such array by the expression:

$$\text{excitation} = 1 + 2 \cos x\pi$$

where $x$ is zero at the centre of the array and unity at each end of the array.

This has a directional pattern which is uniform to about ±3% of amplitude over an angle from $$-\sin^{-1}\left(\frac{\lambda}{l}\right) \text{ to } +\sin^{-1}\left(\frac{\lambda}{l}\right)$$

where $\lambda$ is the wave length of the carrier and $l$ the length of the strip array.

Referring now to the receiving transducer array the transducer elements themselves may be of any of the types previously mentioned. Careful consideration needs to be given to the form of the array namely the number of transducer elements utilized and the effective length of the array.

In this respect it is convenient to refer to the directivity pattern of the individual transducer elements, and of a strip array wherein the elements are spaced apart from each other in a direction perpendicular to the reference axis and in the plane to be scanned.

The directivity pattern is the product of two factors, these being:

(a) the directivity pattern of the individual transducer elements represented by the expression:

$$\frac{\sin\left(\frac{\pi d}{\lambda}\sin\theta\right)}{\frac{\pi d}{\lambda}\sin\theta}$$

where $d$ is the length of an individual transducer element and $\theta$ is the included angle between a wave front arriving from a target offset from the axis of symmetry and the length of the array as seen particularly in FIGURE 15.

(b) the diffraction pattern of '$n$' point transducer elements spaced apart from each other by a distance '$d$' given by the expression:

$$\frac{\sin\left(\frac{\pi nd}{\lambda}\sin\theta\right)}{\sin\left(\frac{\pi d}{\lambda}\sin\theta\right)}$$

Curve (a) in FIGURE 15 represents factor (a) and curve (b) in FIGURE 15 represents factor (b).

It will thus be evident from FIGURE 15 that when there is no phase difference between the signals received by respective transducer elements (that is to say when the target is disposed on the reference axis and the wave front is parallel to the length of the array) the secondary peaks of the curve (b) which occur at values of $\theta$ given by $$\sin = \frac{-\lambda}{d} \text{ and } \sin = \frac{+\lambda}{d}$$

will not produce any signal in the transducer element because curve (a) falls to a zero at these positions and hence the resulting product is zero.

When, however, the beam is deflected by the use of a delay line 13 or 30 as previously described this condition is modified because it is only the diffraction pattern represented by curve (b) which is so deflected whilst clearly the directivity pattern of the individual transducer elements as represented by curve (a) remains undeflected by the delay line. Thus as deflection by the delay line is increased two effects take place:

(1) The main peak of diffraction pattern curve (b) diminishes in accordance with the charactistic represented by curve (a) and (2) One of the secondary peaks of the curve (b) will increase according to the characteristic represented by the curve (a).

Thus when the main peak has been deflected by an angle $$\sin^{-1}\left(\frac{\lambda}{2d}\right)$$

the resultant amplitudes of the main and a secondary diffraction peak are equal, and upon further deflection the secondary diffraction peak exceeds the main peak so as in the effect to replace the main peak.

Thus no useful deflection of the beam by means of a delay line beyond an angle $$\sin^{-1}\left(\frac{\lambda}{2d}\right)$$

is possible and such deflection is limited accordingly to avoid secondary diffraction peaks corresponding to first order side lobes in the polar diagram of the array becoming operative to cause ambiguities through attaining a gain of the same order as that of the main diffraction peak corresponding to the main lobe.

The limit of the scanned sector to be explored is thus seen to be $$\pm\sin^{-1}\left(\frac{\lambda}{2d}\right) \text{ or } \pm\sin^{-1}\left(\frac{\lambda n}{2l}\right)$$

Since $n$ is only the variable (assuming that $\lambda$ and $l$ are fixed by other design considerations) an increase of scanned sector necessitates an increase in the number of sub-divisions of the receiving transducer array and a consequent increase in the number of channels necessary between this array and the delay line.

Since a beam width (between half-power points approximates to an angle of $$\sin^{-1}\left(\frac{\lambda}{l}\right)$$

it will be evident that the maximum scanned sector can conveniently be expressed as approximately '$n$' times the beam width provided the angles concerned do not exceed say about 45°.

Figure 2:
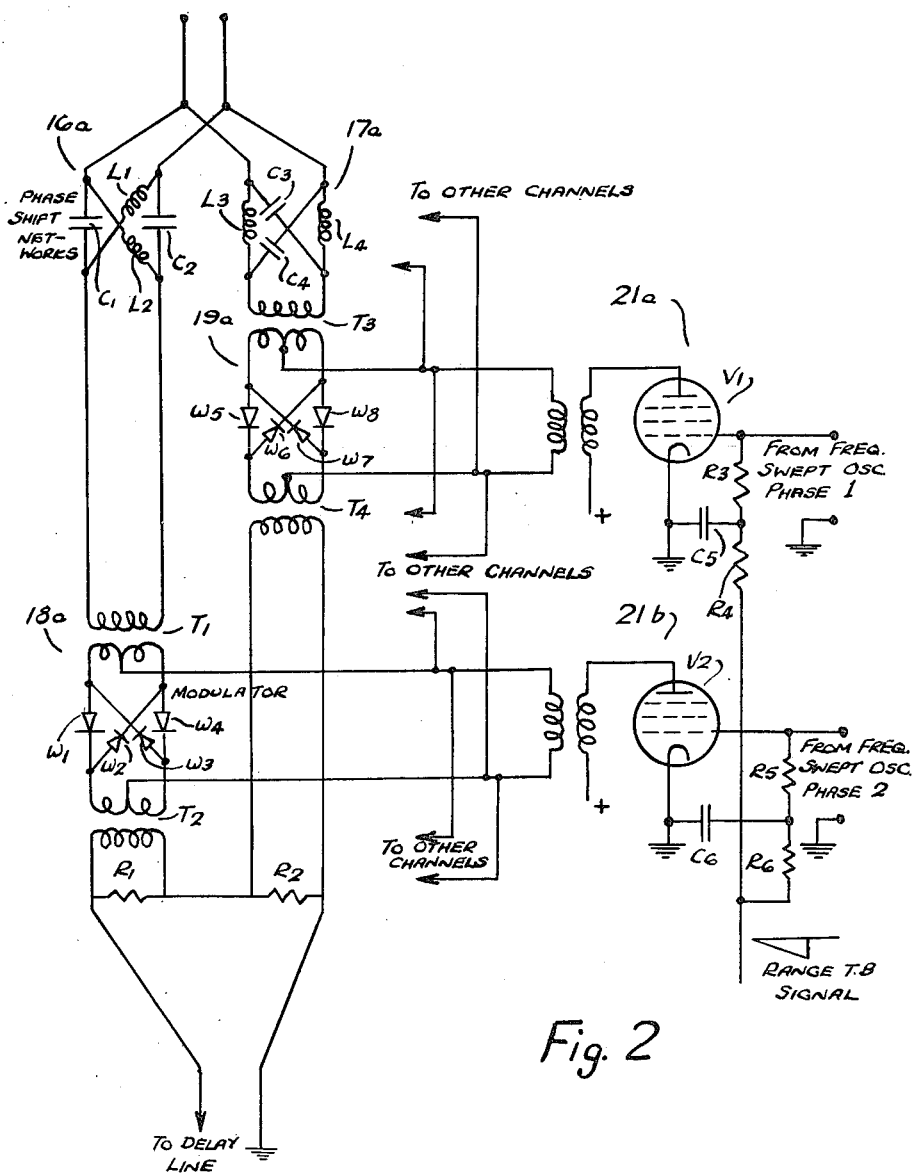
FIGURE 2 is a circuit diagram of the phase shift networks and double balanced modulators contained in one of the channels connecting an element of the receiving transducer array with a respective tapping point on the delay line together with the amplitude control units for feeding the frequency-swept locally generated signal to the modulators.

Referring now to the channels feeding the signal from the transducer elements 12a to 12e to the delay line 13 these are illustrated in greater detail in FIGURE 2.

The phase-shift net works 16a, 16b etc. and 17a, 17b etc. comprise respectively series connected condensers C1 and C2 and cross connected inductances L1 and L2 in the first case and series connected inductances L3 and L4 and cross connected condensers C3 and C4 in the second case. These networks are well known and the further explanation as to their manner of operation and design may be had by reference to "Radio Engineers' Handbook" by F. E. Terman, published by The McGraw-Hill Book Company, Incorporated, New York, 1943, page 247.

For an input signal to these networks received from an associated element of the transducer array of the general form cos $(qt+\theta)$ the outputs from these networks considered relatively to each other may be represented by expressions $$\cos\left(qto+\theta-\frac{\pi}{4}\right) \text{ and } -\sin\left(qto+\theta\frac{-\pi}{4}\right)$$

which outputs are applied respectively to modulator circuits 18a and 19a.

These modulator circuits are in themselves of known form comprising respectively input and output transformers T1 and T2 for 18a and T3 and T4 for 19a and rectifiers w1 to w4 inclusive for 18a and rectifiers w5 to w8 inclusive for 19a.

The manner of operation and design details of these modulator circuits which are generally termed "double-balanced ring modulators" may be had by reference to "Modulators and Frequency Changers" by D. G. Tucker, published by MacDonald & Co. Ltd., London, 1953, particularly chapter 3, section 1.1.

The secondary windings of the transformers T2 and T4 are appropriately terminated by resistors R1 and R2 and the output from the channel is taken from one end of these two resistors, the other end being earthed as shown.

The feeding of the signals from the two outputs (in quadrature with each other) from the frequency swept oscillator 20 is effected respectively through the amplitude control units 21a and 21b each of which conveniently comprises a variable-mu valve as indicated at V1 and V2 respectively, the control grids whereof are fed with an inverted saw tooth signal from the range time base unit 12 so that the gain decreases as a suitable function of time, being at a minimum for the extreme ranges.

Signals received by the receiving transducer array from extreme ranges are of course of substantially smaller amplitude than those received from nearby targets, but the operation of the amplitude control units 21a, 21b provides an approximately constant ratio of amplitudes between the received signals fed into the two ring modulator circuits 18a and 19a and the swept-frequency carrier signals fed into these circuits from the swept frequency oscillator, these latter signals preferably predominating slightly over the received signals at all ranges.

Typical values and types for the components of the amplitude control units are given in the table below—

| Component: | Type or value |
|---|---|
| R3 | ohms__ 100 |
| R4 | do____ 10,000 |
| R5 | do____ 100 |
| R6 | do____ 10,000 |
| C5 | microfarads__ 0.1 |
| C6 | do____ 0.1 |
| V1 | 6SK7 |
| V2 | 6SK7 |

Figure 3:
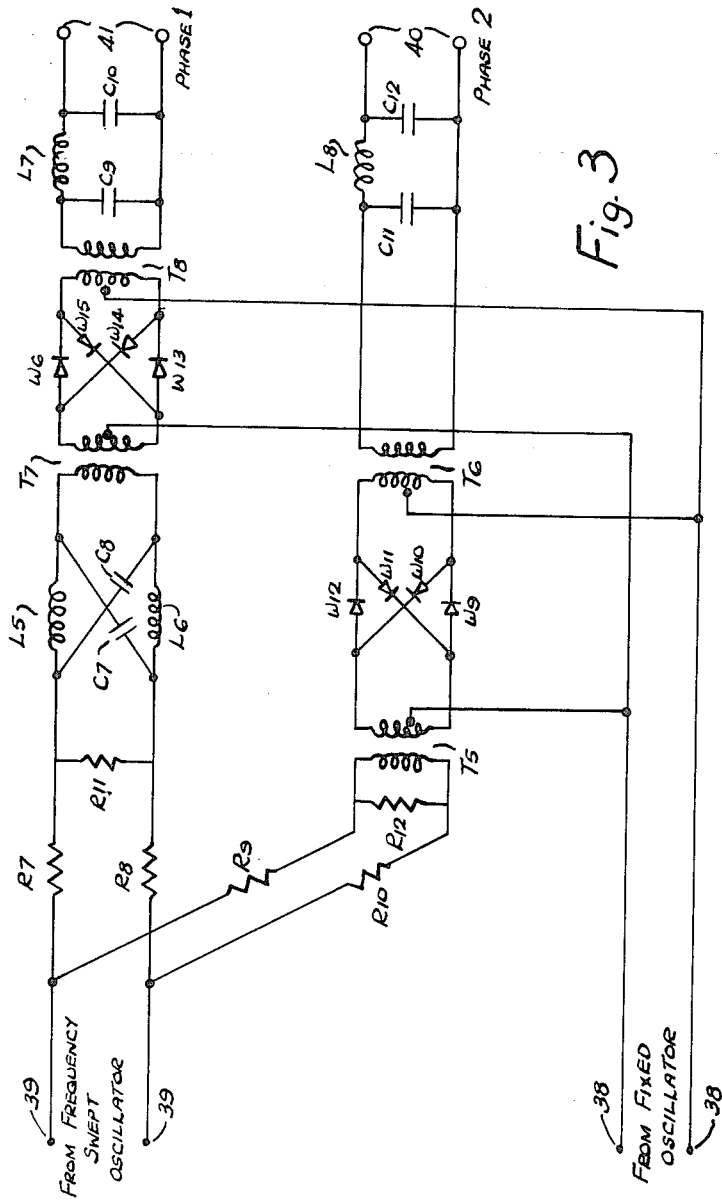
FIGURE 3 is a circuit diagram of the output circuit of a frequency-swept oscillator providing outputs in quadrature with each other for feeding to respective modulators of the channel.

Referring to FIGURE 3 there is therein shown a circuit diagram of an output circuit providing the two outputs (in quadrature with each other) from a frequency swept oscillator suitable for employment as the frequency swept oscillator 20.

The output from a fixed frequency oscillator is applied to terminals 38. The fixed frequency oscillator may be of any suitable known type, for example a Colpitts oscillator would be suitable, this being designed to provide an output at a fixed frequency of 3.525 mc./s. (for a transmitter carrier frequency of 50 kc./s. as previously described by way of example). Further details as to the design and manner of operation of such oscillators including the Colpitts type may be had by reference to:

"Radio Engineers' Handbook," by F. E. Terman, section 6, page 480, particularly figure 1b.

An output from a swept frequency oscillator is applied to terminals 39. The swept frequency oscillator may be as shown in the circuit diagram of FIGURE 10 (to be hereinafter described) and designed to provide a frequency sweep from 3.600 mc./s. to 3.675 mc./s. as a substantially linear function with respect to a time over the duration of a transmitted pulse for example of 1000 microseconds.

The swept and fixed frequency outputs are combined (multiplied) in a modulator circuit comprising input transformer T5, rectifiers w9 to w12 and output transformer T6 the product being fed from the secondary of the transformer T6 through a low pass filter to output terminals 40.

Signals from the two oscillators are further combined (multiplied) in a further modulator comprising input and output transformers T7 and T8, and rectifiers w13 to w16 after passage of the frequency swept signal through a phase-shifting network comprising inductances L5 and L6 and cross connected condensers C7 and C8.

The secondary winding of transformer T8 is connected through a low pass filter to output terminals 41.

It will be evident that at the terminals 40 and 41 there will appear difference frequency signals differing in phase from each other by 90°, the difference frequency ranging from 75 kc./s. to 150 kc./s.

The table below shows suitable values for the components of the circuit:

| Component: | Value |
|---|---|
| R7, R8, R9, R10 | ohms__ 500 |
| R11, R12 | do____ 100 |
| C7 and C8 | microfarad__ 0.00044 |
| C9, C10, C11, C12 | do____ 0.002 |
| L5 and L6 | microhenries__ 4.4 |
| L7 and L8 | millihenry__ 0.02 |

Figure 4:
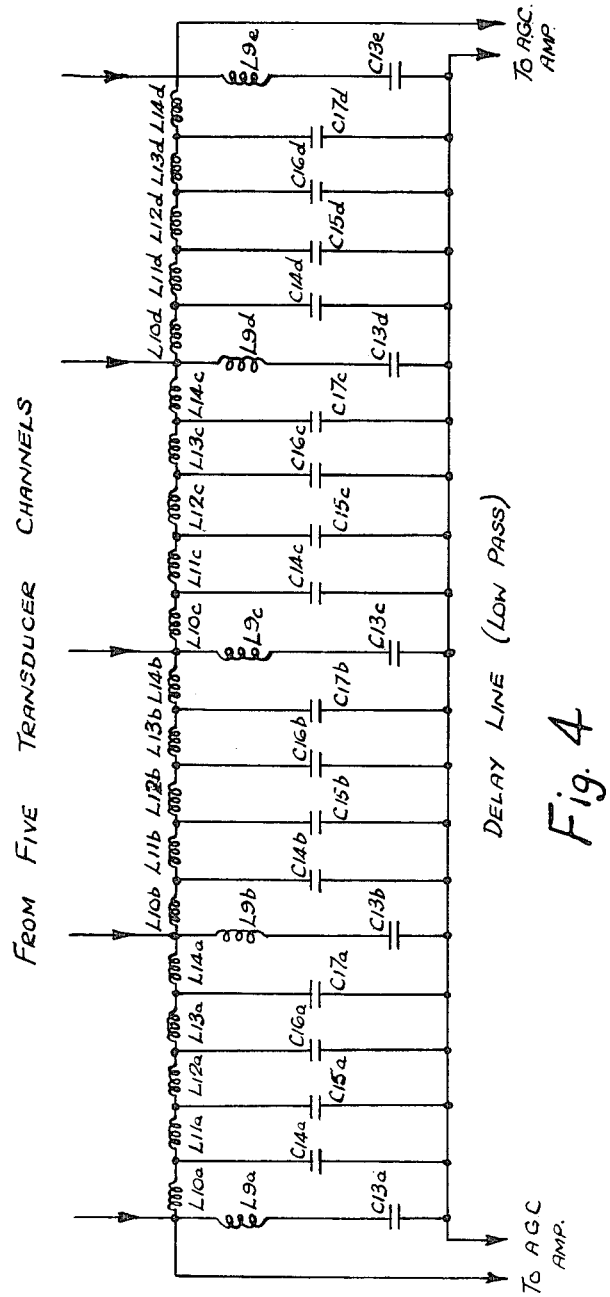
FIGURE 4 is a circuit diagram of one form of delay line suitable for use in the apparatus illustrated in FIGURE 1 where outputs are taken from both ends.

Referring now to the delay line 13 a circuit diagram of this is shown in FIGURE 4. Such delay line provides a positive phase shift of signals applied at the tapping points with respect to the phase at which they appear at either end of the line so that it is necessary to take outputs from both ends of the line to produce a sweep of the transducer beam on each side of the reference axis 15. It will of course be understood that an arrangement wherein an output is taken from only one end of a delay line of this kind can be utilized in which case there will be a sweep of the transducer beam to only one side of the reference axis 15 with a similar reduction in the angle of the explored sector. Enlargement of this angle could of course be attained by utilizing a greater number of transducer elements and hence a greater number of delay line sections, but this would entail increased complication due to the multiplication of the number of channels incorporating modulators and phase-shift networks.

Assuming that the delay line affords a total phase shift from one end to the other of $\phi_T$ radians then the beam of the transducer array will have its axis deflected from its normal direction by an angle of approximately $$\frac{\phi_T \lambda}{2\pi l}$$

radians where $\lambda$ is wave length of the received carrier and $l$ is the length of the transducer array. This expression assumes the angle of deflection to be small and the number $n$ of sections in the transducer to be large since more strictly the deflection is $$\sin^{-1}\left(\frac{n}{n-1} \cdot \frac{\phi_T \lambda}{2\pi l}\right)$$

radians.

When $\phi_T$ equals $\pi$ the angle of deflection of the transducer beam is $$\frac{\lambda}{2l}$$

and assuming that all transducer elements have the same sensitivity and that the transducer array is untapered along its length, then the directional pattern of the beam at an angle of $$\frac{\lambda}{2l}$$

from the direction of peak response has an amplitude which is approximately ⅔ that of the peak, and it is therefore convenient to consider that the value of $\phi_T$ equal to $\pi$ deflects the beam by about one-half of the beam width, although this is only an approximation of the 3 decibels beam width assumed from the foregoing definition thereof.

As has been previously explained variation of $\phi_T$ is obtained by use of a frequency sensitive delay line. Whilst there is flexibility in the selection of frequencies a suitable arrangement is illustrated in FIGURE 5 which shows a frequency sweep from ½ $q$ to $(1+k)q$ completed in the time of the sweep of the bearing time base where the general form of the carrier of the received signal is $\cos(qt+\theta)$.

Thus the frequency applied to the delay line is equal to ½ $q$ at the beginning of the sweep and $kq$ at the end as illustrated by the full line in FIGURE 5.

If the phase-shift/frequency characteristic of the delay line is linear or substantially so (as will be the case assuming adoption of the circuit illustrated in FIGURE 4) and provides a total phase shift $\phi_T$ of $2\pi$ at a frequency $q$ then the transducer beam will be deflected by half a beam width at the beginning of the sweep and the deflection will increase continuously and smoothly to a maximum of $k$ beam widths at the end of the sweep, the cycle then being repeated in consequence of the repetition of the linear saw tooth frequency variation $(p-q)$ as shown by the full line in FIGURE 5. The phase shift/frequency characteristic of the delay line is illustrated graphically in FIGURE 7 wherein the phase shift $\phi_T$ is the ordinate and the frequency is the abscissa.

It will be evident therefore that at the beginning of the sweep the transducer beam is not coincident with the reference axis 15 but is in fact deflected by an angle equal to half a beam width to the left of the reference axis 15, as seen from the right hand end of the delay line, and to the right of the reference axis by half a beam width as seen from the left hand end of the delay line. Signals received from targets disposed on the reference axis are thus indicated by coincident presentation of signals of ⅔ amplitude from both left hand and right hand scans of the transducer beam and cathode ray tube beams and since this arrangement would give a somewhat excessive response to targets positioned on the reference axis 15 the gain of the amplifiers 14a and 14b is reduced between frequencies of $q$ and ½ $q$ as illustrated in FIGURE 6 wherein gain is plotted as ordinate and frequency as the abscissa. These amplifiers also incorporate detector circuits.

The design of such amplifiers is well known in the art and reference may be had for further details to:

"Vacuum Tube Amplifiers" by Valley and Wallman, volume 18 of The Radiation Laboratory Series, published by The McGraw-Hill Book Company, Incorporated, New York, particularly the sections thereof dealing with staggered tuned amplifiers and gain control therein.

Reference may also be had to this publication as to the design of amplifiers suitable for the video amplifiers 25a and 25b.

Component values for a delay line having the circuit shown in FIGURE 4 and suitable for use with a received signal carrier frequency of 50 kc./s. and a total scanned sector equal to 5 times the beam width are given in the table below—

| Component: | Value |
|---|---|
| C13b to C13d _____ micromicrofarads__ | 1060 |
| C14a to C14d _____ do ____ | 1770 |
| C15a to C15d _____ do ____ | 1770 |
| C16a to C16d _____ do ____ | 1770 |
| C17a to C17d _____ do ____ | 1770 |
| C13a and C13e _____ do ____ | 530 |
| L10a to L10d _____ microhenries __ | 508 |
| L14a to L14d _____ do ____ | 508 |
| L11a to L11d _____ do ____ | 636 |
| L12a to L12d _____ do ____ | 636 |
| L13a to L13d _____ do ____ | 636 |
| L9b to L9d _____ do ____ | 145 |
| L9a and L9e _____ do ____ | 290 |

The range time base unit 9 and the bearing time base unit 27 as well as the push-pull amplifier 29 through which the output from the later is fed to the pairs of plates 23a and 23b may be of any suitable known form, the design of time base units and amplifiers for this purpose being well understood by those skilled in the art. A publication to which reference may be made in this connection is "Principles of Radar" by Reintjes and Coate, particularly chaper 3 thereof published in 1946 by McGraw-Hill Book Company, Incorporated, New York.

It will be understood that the cathode ray tube 22 may be of any suitable type providing a twin beam display and incorporates a single pair of deflection plates 24 (of which one is visible in the schematic diagram of FIGURE 1) these plates being connected respectively to the output terminals of the range time base whilst the tube incorporates a shown separate reflection plates 23a and 23b and separate control grids 26a and 26b for receiving the outputs on the video amplifiers 25a and 25b.

Range information is produced on the cathode ray tube 22 as the value of the "Y" co-ordinate at which a bright spot is produced on the face of the tube in consequence of received signal applied to the control grids 26a, 26b, thereof. It will be understood that beam deflection in the "Y" direction is produced by the range-time base unit 9 furnishing a linear (or other desired form) of saw-tooth voltage output synchronised with the pulses emitted by the transmitting transducer 11 by a locking signal fed from the pulse generator to provide sweep of the cathode ray tube beam in the "Y" direction starting at an instant corresponding to zero range and terminating at an instant corresponding to the maximum range required, the time interval between these two instants being the transit time of a radiated sound pulse travelling from the transmitting transducer 11 to a target at extreme range and, after reflection therefrom, back to the receiving transducer array 12a to 12e. Any suitable form of range calibration may be provided or in association with the cathode ray tube 22 or range tube base unit 9.

Referring now specifically to the particular forms and operating characteristics of the main components of the alternative form of apparatus illustrated in FIGURE 8 which differ from those already described in detail in connection with the apparatus illustrated in FIGURE 1 reference is made firstly to the channels which connect the respective transducer elements 12a to 12e inclusive to their tapping points on the delay line 30.

The resultant signal which emerges at the output end of each of these channels to the delay line is of a form similar to that already described in connection with FIGURE 1 in as much as it consists of a single side band of a swept frequency (being the difference between the carrier frequency of the received signal and a locally generated swept frequency carrier) but the manner of attaining this result is different as is also the treatment of each of these signals in the delay line itself, the latter being such as to provide a sweep from a negative phase-shift to a positive-phase shift as seen at one end of the line thereby avoiding the use of a twin beam cathode ray tube and duplication of the amplifying and detection channels and bearing time base unit and associated amplifier.

One of the channels consisting of modulators 31a and 34a and filter 33a is illustrated as a circuit diagram in FIGURE 9 the principle of modulation utilizing the so called (transformerless modulators) being discussed more fully in "Modulators and Frequency Changes" by D. G. Tucker particularly chapter 3, section 1.4, published by MacDonald & Co. Ltd., London, to which reference may be had for a complete explanation.

The first modulator comprises valves V3 and V4 the former receiving on its control grid a signal from the fixed frequency oscillator 32 and the signal from the transducer element, in this case 12a, being fed as shown into the anode-cathode circuit of V3 the resultant sum and difference components appearing at the control grid of V4 which acts as a cathode follower applying signals to the input terminals of filter 33a.

The latter is designed in this particular example as a high pass filter to pass the difference component and stop the sum frequency and all carrier leaks and side bands of harmonics of the fixed frequency, but equally well the filter could have been a bandpass filter passing the sum component and rejecting the difference frequency and all carrier leaks etc.

FIGURE 12 is a graph illustrating the operation of the circuit wherein frequency is plotted as the ordinate and time as the abscissa.

The frequency of the fixed frequency oscillator is S, and the component $S-q$ is represented by the line 42.

The difference component from the high pass filter 33a is fed to the control grid of a correction amplifier affording variable gain comprising the valve V5 and associated circuit, the output of this amplifier being fed to the anode-cathode circuit of the second modulator 34a which incorporates valve V6 to the control grid of which is supplied the variable frequency input from the frequency swept oscillator 35.

The purpose of the correction amplifier is to compensate for the fact that the delay line 30 does produce some attenuation of the signals fed thereto at the various tapping points before these reach the right hand end of the delay line, and such attenuation will be greatest in respect of the channel associated with the transducer element 12a and have a correspondingly smaller value progressively for the channels associated with the elements 12b to 12e (being zero for the last mentioned) having regard to the fact that signals from the channels associated with these elements pass through a lesser number of sections of the delay line. The gain of the correction amplier for each channel is thus adjusted (for example by selection of suitable valves for R22 and R23) to compensate for the unequal attenuation of the signals fed from the several channels through the delay line.

The particular form of delay line of which the circuit is shown in FIGURE 11, has stop characteristics at the upper end of its pass band which are adequate to obviate the necessity for providing a separate low pass filter in each of the channels connecting respective transducer elements to their respective tapping points.

However, it will be understood that in other circumstances such filters might be required and the component values thereof in this case would be selected in a manner well understood by those skilled in the art.

The input from the swept frequency oscillator to valve V6 of the second modulator is shown by the line 43 in the graph of FIGURE 12, the frequency of this output having a value at any instant of $p+u$ where $u$ is a function of the bearing time base output voltage represented by $\alpha(t)$.

The low pass filter 36a will pass only the difference component $p+q-S+u(\alpha)$, as indicated by the line 44 which has a frequency range as shown determined by the upper and lower limits of the frequency of the output from the swept frequency oscillator 35.

It should be noted that the overall range of the frequency sweep may be less $nq$ (where $n$ is the number of beam widths contained in the scanned sector) but it should be larger than $$\frac{n}{\tau}$$

(where $\tau$ is the pulse duration in seconds and the band width is measured in cycles per second) if excessive distortion is to be avoided.

Such distortion would tend to arise if the frequency sweep were narrow compared with the pulse spectrum $$\left(\text{approximately } \frac{1}{\tau}\right)$$

because the different frequency components of such spectrum would be subjected to greatly differing phase-shifts in the delay line.

For a received signal carrier of 50 kc./s. the fixed frequency oscillator may generate a signal having a frequency of 1.05 mc./s. and the swept frequency oscillator a frequency varying from 3.165 mc./s. to 3.675 mc./s.

Suitable values of the components of the circuit of FIGURE 9 for these frequencies are set out in the table below:

| | | |
|---|---|---|
| R12a | megohm | 1 |
| R13 | kilohms | 2.2 |
| R14 | do | 2.2 |
| R15 | ohms | 220 |
| R16 | do | 220 |
| R17 | Potentiometer ohms | |
| R18 | ohms | 150 |
| R19 | kilohms | 5.6 |
| R20 | ohms | 890 |
| R21 | do | 260 |
| R22 | kilohms | 100 |
| R23 | do | 470 |
| R24 | do | 5.6 |
| R25 | do | 2.2 |
| R26 | ohms | 160 |
| R27 | kilohms | 60 |
| R28 | megohm | 1 |
| R29 | kilohms | 2.2 |
| R30 | do | 2.2 |
| R31 | ohms | 220 |
| R32 | do | 220 |
| R33 | do | 620 |
| C18 | microfarads | 0.01 |
| C19 | do | 0.01 |
| C20 | do | 0.002 |
| C21 | do | 0.01 |
| C22 | micro-microfarads | 178.5 |
| C23 | do | 1190 |
| C24 | do | 178.5 |
| C25 | microfarads | 0.002 |
| C26 | do | 0.01 |
| C27 | do | 0.02 |
| C28 | do | 0.01 |
| C29 | do | 0.001 |
| C30 | do | 0.01 |
| C31 | do | 0.01 |
| L15 | microhenries | 121.8 |
| L18 | do | 121.8 |
| L16 | do | 52.3 |
| L17 | do | 52.3 |

V3 ------------------------------------------ Type 6J5
V4 ------------------------------------------ Type 6J5
V5 ------------------------------------------ Type 6AC7
V6 ------------------------------------------ Type 6J5

The fixed frequency oscillator may be of the Colpitts type and details as to the design and manner of operation may be had from the publication referred to in connection with the fixed frequency oscillator employed in the circuit arrangement of FIGURE 1.

A suitable circuit for the swept frequency oscillator is illustrated in FIGURE 10 wherein V7 is connected to operate as a reactance valve and receives on its grid a positive-going saw toothed wave form from the bearing time base unit.

The manner of operation of reactance valves is well understood but reference may be had if desired to "Radio Engineers' Hand Book" by F. E. Terman, section 9, published by McGraw-Hill Book Company, Incorporated, New York.

This reactance valve is connected across the divided capacity constituted by condensers C44 and C45 of V8 which constitutes the oscillator valve, the output from the oscillator being fed to a valve 9 connected as amplitude limiter operation of which is again well understood but to which reference may be had in section 6, paragraph 6, of the last mentioned publication, and for an output valve V10.

The table below shows suitable component values for the circuit:

| | | |
|---|---|---|
| R35 | kilohms | 1 |
| R36 | do | 470 |
| R37 | do | 56 |
| R38 | megohm | 1 |
| R39 | kilohms | 20 |
| R40 | ohms | 220 |
| R41 | kilohms | 100 |
| R42 | megohm | 1 |
| R43 | kilohms | 470 |
| R44 | do | 20 |
| R45 | do | 30 |
| R46 | ohms | 220 |
| R36a | do | 220 |
| C39 | micro-microfarads | 700 |
| C40 | microfarads | 0.02 |
| C41 | do | 0.02 |
| C42 | micro-microfarads | 20 |
| C43 | microfarads | 0.02 |
| C44 | micro-microfarads | 150 |
| C45 | do | 150 |
| C46 | microfarads | 0.02 |
| C47 | do | 0.02 |
| C48 | do | 0.02 |
| C48 | do | 0.02 |
| C49 | do | 0.02 |
| C50 | micro-microfarads | 500 |
| C51 | microfarads | 0.02 |
| C52 | do | 0.02 |
| C53 | do | 0.02 |
| C54 | do | 0.02 |
| V7 | Type EF89 | |
| V8 | Type EF91 | |
| V9 | Type EA50 | |
| V10 | Type EF91 | |

Referring now to the delay line 30 this is composed of four sections providing as seen from the right hand end of the line a phase shift which is illustrated graphically in FIGURE 13 wherein phase shift $\phi$ is plotted as the ordinate and frequency as the abscissa.

At a mid-value of the frequency range phase shift is zero so that as seen from the right hand end of the line the transducer beam would appear coincident with the reference axis 15. For input signals to the tapping points of the delay line having a frequency characteristic as illustrated by FIGURE 12 the frequencies indicated by the dotted lines 45 and 46 will correspond to the lower and upper limits respectively of the frequency sweep 44 in FIGURE 12.

For a single side-band signal ranging from 2.165 mc./s. to 2.675 mc./s. component values suitable for employment in the delay line 30 are as follows:

| | | |
|---|---|---|
| R34a to R34e | kilohms | 47 |
| C32a and C32e | micro-microfarads | 175.5 |
| C32b to C32c | do | 351 |
| C33a and C33e | do | 38.8 |
| C33b to C33d | do | 77.6 |
| C34a to C34d | do | 590 |
| C37a to C37d | do | 590 |
| C35a to C35d | do | 25.7 |
| C38a to C38d | do | 25.7 |
| C36a to C36d | do | 20.6 |
| L19a and L19e | microhenries | 25 |
| L19b to L19d | do | 12.5 |
| L20a to L20d | do | 169.6 |
| L23a to L23d | do | 169.6 |
| L21a to L21d | do | 7.42 |
| L24a to L24d | do | 7.42 |
| L22a to L22d | do | 212 |
| L25a and L25e | do | 113 |
| L25b to L25d | do | 56.5 |

It will be understood that the form of channel connecting each transducer element with a tapping point on the delay line as described with reference to FIGURES 8 to 12 may be employed with a delay line of the kind described and illustrated with reference to FIGURES 1 to 5 in which case a twin beam cathode ray tube will be required for display purposes. Alternatively the form of channel described and illustrated with reference to FIGURES 1 to 5 may be employed with a delay line of the kind shown in FIGURE 11 in which case output will be taken from one end only of this delay line and a single beam cathode ray tube utilized for display.

What I claim is:

1. In a position finding apparatus comprising a transmitter for emitting a series of time-spaced pulses of wave energy through a target containing medium, amplifier means, and a display device having means for positionally indicating signal reception; the combination with said amplifier means of a receiving beam-forming transducer array comprising spaced transducer elements connected with respective signal channels feeding said amplifier means, means for generating a local signal varied through a range of values within a time interval equal to the duration of each of said emitted pulses and repeated a plurality of times within each pulse repetition period, phase-shift elements in said channels responsive to each instantaneous value of said local signal within said range to impose respective phase shifts of differing magnitude in each channel and hence to determine the relative phases of signals arriving at said amplifier means and thus to determine the angular position of a beam formed by said array in relation to a referenct axis thereof, means for coordinating variation of said local signal with said means of positionally indicating signal reception and means for applying said local signal to said phase shift elements to swing said beam through a sector of said target containing medium in said time interval and for a corresponding number of times within each pulse repetition period.

2. In a position finding apparatus comprising a transmitter for emitting a series of time-spaced pulses of wave energy through a target containing medium, amplifier means, and a display device having means for positionally indicating signal reception; the combination with said amplifier means of a receiving beam-forming transducer array comprising spaced transducer elements connected with respective signal channels feeding said amplifier means, means for generating a local signal varied through a range of values within a time interval equal to the duration of each of said emitted pulses and repeated a plurality of times within each pulse repetition period, phase-shift elements in said channels responsive to each instantaneous value of said local signal within said range to impose respective phase-shifts of differing magnitude in each channel with concomitant time delays differing respectively by substantially less than the duration of each of said emitted pulses so that respective signals traversing said channels arrive in time-overlapping phase shifted relation at said amplifier means, means for co-ordinating variation of said local signal with said means for positionally indicating signal reception and means for applying said local signal to said phase shift elements to swing said beam through a sector of said target containing medium in said time interval and for a corresponding number of times within each pulse repetition period.

3. In a position finding apparatus comprising a transmitter for emitting a series of time-spaced pulses of wave energy through a target containing medium, amplifier means, and a display device having means for positionally indicating signal reception; the combination with said amplifier means of a receiving beam-forming tranducer array comprising spaced tranducer elements connected with respective signal channels feeding said amplifier means, phase-shift elements having phase-shift characteristics variable as a function of frequency and providing throughout a frequency sweep differential coordinated phase-shifts in each channel respectively, to determine the relative phases of signals arriving at said amplifier means and thus to determine the angular position of a beam formed by said array in relation to a reference axis thereof, modulator means in said channels between said transducer elements and said phase-shift elements, local oscillator means connected with said modulator means and including means for varying the frequency of at least one local signal output therefrom within a time interval equal to the duration of each of said emitted pulses and repeated a plurality of times within each pulse repetition period, means for coordinating variations of said local signal with said means for positionally indicating signal reception, said modulator means including means for selectively feeding a single side-band of the resultant modulated carrier of the signal passing through each of said channels to the phase-shift elements therein whereby the latter are effective to swing said beam through a sector of said target containing medium in said time interval and for a corresponding number of times within each pulse repetition period.

4. In a position finding apparatus comprising a transmitter for emitting a series of time-spaced pulses of wave energy through a target containing medium, amplifier means, and a display device having means for positionally indicating signal reception; the combination with said amplifier means of a receiving beam-forming transducer array comprising spaced transducer elements connected with respective signal channels feeding said amplifier means, phase-shift elements having phase-shift characteristics variable as a function of frequency to determine the relative phases of signals arriving at said amplifier means and thus to determine the angular position of a beam formed by said array in relation to a reference axis thereof, each of said channels including between said transducer elements and said phase-shift elements two phase-shift networks providing quadrature phase-shift as between the carriers of signals passing through said networks, and modulator circuits having inlets connected to these phase-shift networks respectively, a frequency swept local oscillator providing output components of swept frequency in quadrature with each other and connected to said modulator circuits to feed said components thereto respectively, said modulator circuits being connected to each other at their exits and adapted to provide at least predominantly only a difference frequency between the frequency of said carrier and the frequency of said components of local oscillator output, said local oscillator including means for producing sweep of its frequency within a time interval equal to the duration of each of said emitted pulses and repeated a plurality of times within each pulse repetition period, whereby the phase-shift elements fed with said difference frequency are effective to swing said beam through a sector of said target containing medium in said time interval and for a corresponding number of times within each pulse repetition period and means for coordinating said frequency sweeps with said means for positionally indicating signal reception.

5. In a position finding apparatus comprising a transmitter for emitting a series of time-spaced pulses of wave energy through a target containing medium, amplifier means, and a display device having means for positionally indicating signal reception; the combination with said amplifier means of a receiving beam-forming transducer array comprising spaced transducer elements connected with respective signal channels feeding said amplifier means, phase-shift elements having phase-shift characteristics variable as a function of frequency and providing throughout a frequency sweep differential coordinated phase-shifts in each channel respectively, to determine the relative phases of signals arriving at said amplifier means and thus to determine the angular position of a beam formed by said array in relation to a reference axis thereof, each of said channels including a first modulator circuit having its inlet connected to the transducer element of the channel, filter means connected to its exit for passing a single side band of a modulated carrier in the channel, a second modulator circuit having its inlet connected to the exit of said filter means and its exit connected to the phase-shift element of the channel, a local fixed frequency oscillator common to all of the first modulator circuits and connected thereto, a local swept frequency oscillator common to all of the second modulator circuits and connected thereto whereby each of the phase-shift elements is fed with a single side band of the carrier modulated in the second modulator circuit, said local swept frequency oscillator including means for producing sweep of its frequency within a time interval equal to the duration of each of said emitted pulses and repeated a plurality of times within each pulse repetition period, whereby the phase-shift elements fed with said single side band of the carrier are effective to swing said beam through a sector of said target containing medium in said time interval and for a corresponding number of times within each pulse repetition period and means for coordinating said frequency sweeps with said means for positionally indicating signal reception.

6. In a position finding apparatus comprising a transmitter for emitting a series of time-spaced pulses of wave energy through a target containing medium, amplifier means, and a display device having means for positionally indicating signal reception; the combination with said amplifier means of a receiving beam-forming transducer array comprising spaced transducer elements forming a beam including a main lobe and side lobes, means for generating a local signal, means for varying said local signal through a range of values and within a time interval equal to the duration of each of said emitted pulses and repeated a plurality of times within each pulse repetition period, phase-shift elements in said channels, responsive to each instantaneous value of said local signal to impose respective phase-shifts differing in each channel by an amount changing progressively in value in channels connected to elements of said array occupying successive positions along the array, but independent of the lateral separation between such transducer elements, to determine the relative phases of signals arriving at said amplifier means and thus to determine the angular position of a beam formed by said array in relation to a reference axis thereof, means for coordinating operation of said means for varying said local signal with operation of said means for positionally indicating signal reception, said range of values of signal variation being such that said beam swings through a sector of said target containing medium less than that bounded by the axes of the first order of side lobes of said array by an amount avoiding the latter attaining a gain equal to that of the main lobe.

7. In a position finding apparatus comprising a transmitter for emitting a series of time-spaced pulses of wave energy through a target containing medium, amplifier means, and a display device having means for positionally indicating signal reception; the combination with said amplifier means of a receiving beam-forming transducer array comprising directional transducer elements disposed to present their highest gain receiving faces generally in a common direction and spaced from each other transversely of said direction, to set up an overall polar diagram including a main lobe extending in said direction and side lobes of lesser gain at angularly spaced positions on each side of said main lobe, said transducer elements being connected with respective signal channels feeding said amplifier means, means for generating a local signal, means for varying said local signal within a time interval equal to the duration of each of said emitted pulses and repeated a plurality of times within each pulse repetition period and through a range of values, phase-shift elements in said channels responsive to each instantaneous value of a local signal within said range to impose phase shifts by an amount changing progressively in value in channels connected to elements of said array occupying successive positions along the array but independent of the lateral separation between such transducer elements; means for coordinating operation of said means for varying said local signal with operation of said means for positionally indicating signal reception, said range of values of signal variation being such that said beam swings through a sector of said target containing medium less than that bounded by the axes of the first order of side lobes of said array by an amount avoiding the latter attaining a gain equal to that of the main lobe.

8. In a position finding apparatus comprising a transmitter for emitting a series of time-spaced pulses of wave energy through a target containing medium, amplifier means, and a display device having means for positionally indicating signal reception; the combination with said amplifier means of a receiving beam-forming transducer array connected with respective signal channels feeding said amplifier means, means for generating a local signal, means for varying said local signal within a time interval equal to the duration of each of said emitted pulses and repeated a plurality of times within each pulse repetition period, through a range of values, phase-shift elements in said channels responsive to said local signal to impose phase-shifts in said channels differing by an amount from channel to channel along said array by a maximum of $2\pi$ radians, the separation between successive transducer elements being such that an equivalent phase-shift as between signals incident thereat corresponds to a target direction at which first order side lobe gain is still substantially below main lobe gain in this direction, means coordinating operation of said means for varying said local signal with operation of said means for positionally indicating signal reception, said range of variation of said signal being such that said beam swings through a sector of said target containing medium less than that bounded by the axes of the first order of side lobes of said array by an amount avoiding the latter attaining a gain equal to that of the main lobe.

9. In a position finding apparatus comprising a transmitter for emitting a series of time-spaced pulses of wave energy through a target containing medium, amplifier means, and a display device having means for positionally indicating signal reception; the combination with said amplifier means of a receiving beam-forming transducer array comprising directional transducer elements disposed to present their highest gain receiving faces generally in a common direction and spaced from each other transversely of said direction, to set up an overall polar diagram including a main lobe extending in said direction and side lobes of lesser gain at angularly spaced positions on each side of said main lobe, said transducer elements being connected with respective signal channels feeding said amplifier means, phase-shift elements having phase-shift characteristics variable as a function of frequency to vary the magnitude of the phase-shift produced in each channel by an amount changing progressively in value in channels connected to elements of said array occupying successive positions along the array but independent of the lateral separation between such transducer elements, and hence to determine the relative phases of signals arriving at said amplifier means, modulator means in said channels between said transducer elements and said phase-shift elements, local oscillator means connected with said modulator means and including means for varying the frequency of at least one local signal output therefrom through a range of frequency to swing said main lobe through a sector of the target containing medium less than that bounded by the axis of the first order of side lobes of said array by an amount avoiding the latter attaining a gain equal to that of the main lobe, and within a time interval equal to the duration of each of said emitted pulses and repeated a plurality of times within each pulse repetition period, said modulator means including means for selectively feeding a single side band of the resultant modulated carrier of the signal passing through each of said channels to the phase shift elements therein, and means for coordinating operation of said means for varying the frequency with operation of said means for positionally indicating signal reception.

10. In a position finding apparatus comprising a transmitter for emitting a series of time-spaced pulses of wave energy through a target containing medium, amplifier means, and a display device having means for positionally indicating signal reception; the combination with said amplifier means of a receiving beam-forming transducer array comprising directional transducer elements disposed to present their highest gain receiving faces generally in a common direction and spaced from each other transversely of said direction, to set up an overall polar diagram including a main lobe extending in said direction and side lobes of lesser gain at angularly spaced positions on each side of said main lobe, said transducer elements being connected with respective signal channels feeding said amplifier means, phase-shift elements having phase-shift characteristics variable as a function of frequency to vary the magnitude of the phase-shift produced in each channel from channel to channel by an amount having a maximum value of $2\pi$ radians, the separation between successive transducer elements being such that an equivalent phase-shift as between signals incident thereat corresponds to a target direction at which first order side lobe gain is still substantially below main lobe gain in this direction, modulator means in said channels between said transducer elements and said phase-shift elements, local oscillator means connected with said modulator means and including means for varying the frequency of at least one local signal output therefrom through a range of frequency to swing said main lobe through a sector of the target containing medium less than that bounded by the axes of the first order of side lobes of said array by an amount avoiding the latter attaining a gain equal to that of the main lobe, and within a time interval equal to the duration of each of said emitted pulses and repeated a plurality of times within each pulse repetition period, said modulator means including means for selectively feeding a single side band of the resultant modulated carrier of the signal passing through each of said channels to the phase-shift elements therein, and means for coordinating operation of said means for varying the frequency with operation of said means for positionally indicating signal reception.

11. Apparatus for acoustic position finding comprising a transmitter including means for emitting a series of time-spaced sound pulses of short duration and inherently high range discrimination through a target containing medium, a receiver including a beam forming transducer array having spaced transducer elements connected with respective signal channels, amplifier means fed from said signal channels, and connected to means for positionally indicating signal reception comprising range time-base means, and beam position indicating means, means for generating a local signal varied through a range of values within a time interval equal to the duration of each of said emitted pulses and repeated a plurality of times within each pulse repetition period, phase-shift elements in said channels responsive to each instantaneous value of said local signal within said range to impose respective phase-shifts differing in magnitude in each channel and hence to determine the relative phases of signals arriving at said amplifier means and thus to determine the angular position of a beam formed by said array in relation to a reference axis thereof, means for applying said local signal to said phase-shift elements to swing said beam through a sector of said target containing medium in said time interval and for a corresponding number of times within each pulse repetition period, and means coordinating variation of said local signal with operation of said beam position indicating means to provide instantaneous and concurrent position determination of small sized targets in said sector.

12. Apparatus for acoustic position finding comprising a transmitter including means for emitting a series of time-spaced sound pulses of short duration and inherently high range discrimination through a target containing medium, a receiver including a beam forming transducer array having spaced transducer elements connected with respective signal channels, amplifier means fed from said signal channels and connected to means for positionally indicating signal reception comprising range time-base means, and beam position indicating means, means for generating a local signal varied through a range of values within a time interval equal to the duration of each of said emitted pulses and repeated a plurality of times within each pulse repetition period, phase-shift elements in said channels responsive to each instantaneous value of said local signal to impose respective phase-shifts differing in magnitude in each channel with concomitant time delays differing respectively by substantially less than the duration of each of said emitted pulses so that respective signals traversing said channels arrive in time-overlapping phase-shifted relation at said amplifier means, means for generating a local signal varied within a time interval equal to the duration of each of said emitted pulses and repeated a plurality of times within each pulse repetition period, means for applying said local signal to said phase-shift elements to swing said beam through a sector of said target containing medium in said time interval and for a corresponding number of times within each pulse repetition period, and means coordinating variation of said local signal with operation of said beam position indicating means to provide instantaneous and concurrent position determination of small sized targets in said sector.

13. Apparatus for acoustic position finding comprising a transmitter including means for emitting a series of time-spaced sound pulses of short duration and inherently high range discrimination through a target containing medium, a receiver including a beam forming transducer array having spaced transducer elements connected with respective signal channels, amplifier means fed from said signal channels, and connected to means for positionally indicating signal reception comprising range time-base means, and beam position indicating means, phase-shift elements having phase-shift characteristics variable as a function of frequency and providing throughout a frequency sweep differential coordinated phase-shifts in each channel respectively to determine the relative phases of signals arriving at said amplifier means and thus to determine the angular position of a beam formed by said array in relation to a reference axis thereof, frequency changing means in said channels for effecting an upward change of carrier frequency and including a local oscillator means producing an output of higher frequency than the carrier frequency of the transmitter, means for varying the frequency of at least one local signal output of said local oscillator means within a time interval equal to the duration of each said emitted pulses, and repeated a plurality of times within each pulse repetition period, said modulator means including means for selectively feeding a single side band of the resultant modulated carrier of the signal passing through each of said channels to the phase-shift elements therein whereby the latter are effective to swing said beam through a sector of said target containing medium in said time interval and for a corresponding number of times within each pulse repetition period, and means coordinating variation of said local signal with operation of said beam position indicating means to provide instantaneous and concurrent position determination of small sized targets in said sector.

14. Apparatus for acoustic position finding comprising a transmitter including means for emitting a series of time-spaced sound pulses of short duration and inherently high range discrimination through a target containing medium, a receiver including a beam forming transducer array having spaced transducer elements connected with respective signal channels, amplifier means fed from said signal channels, and connected to means for positionally indicating signal reception comprising range time-base means, and beam position indicating means, phase-shift elements having phase-shift characteristics variable as a function of frequency and providing throughout a frequency sweep differential coordinated phase-shifts in each channel respectively to determine the relative phases of signals arriving at said amplifier means and thus to determine the angular position of a beam formed by said array in relation to a reference axis thereof, each of said channels including between said transducer elements and said phase-shift elements two phase-shift networks providing quadrature phase-shift as between the carriers of signals passing through said networks, and modulator circuits having inlets connected to these phase-shift networks respectively, a frequency swept local oscillator providing output components of swept frequency in quadrature with each other and connected to said modulator circuits to feed said components thereto respectively, said modulator circuits being connected to each other at their exits and adapted to provide at least predominantly only a difference frequency between the frequency of said carrier and the frequency of said components of local oscillator output, said local oscillator including means for producing sweep of its frequency within a time interval equal to the duration of each of said emitted pulses and repeated a plurality of times within each pulse repetition period, whereby the phase-shift elements fed with said difference frequency are effective to swing said beam through a sector of said target containing medium in said time interval and for a corresponding number of times within each pulse repetition period, and means coordinating operation of said frequency sweep producing means with operation of said beam position indicating means to provide instantaneous and concurrent position determination of small sized targets in said sector.

15. Apparatus for acoustic position finding comprising a transmitter including means for emitting a series of time-spaced sound pulses of short duration and inherently high range discrimination through a target containing medium, a receiver including a beam forming transducer array having spaced transducer elements connected with respective signal channels, amplifier means fed from said signal channels, and connected to means for positionally indicating signal reception comprising range time-base means, and beam position indicating means, phase-shift elements having phase-shift characteristics variable as a function of frequency and providing throughout a frequency sweep differential coordinated phase-shifts in each channel respectively, to determine the relative phases of signals arriving at said amplifier means and thus to determine the angular position of a beam formed by said array in relation to a reference axis thereof, each of said channels including between said transducer elements and said phase-shift elements two phase-shift networks providing quadrature phase-shift as between the carriers of signals passing through said networks, and modulator circuits having inlets connected to these phase-shift networks respectively, a frequency swept local oscillator providing output components of swept frequency in quadrature with each other and connected to said modulator circuits to feed said components thereto respectively, amplitude control means regulating the amplitude of said output components and including means operative to reduce such amplitude as a function of time over the interpulse interval, said modulator circuits being connected to each other at their exits and adapted to provide at least predominantly only a difference frequency between the frequency of said carrier and the frequency of said components of local oscillator output, said local oscillator including means for producing sweep of its frequency within a time interval equal to the duration of each of said emitted pulses and repeated a plurality of times within each pulse repetition period, whereby the phase-shift elements fed with said difference frequency are effective to swing said beam through a sector of said target containing medium in said time interval and for a corresponding number of times within each pulse repetition period, and means coordinating operation of said frequency sweep producing means with operation of said beam position indicating means to provide instantaneous and concurrent position determination of small sized targets in said sector.

16. Apparatus for acoustic position finding comprising a transmitter including means for emitting a series of time-spaced sound pulses of short duration and inherently high range discrimination through a target containing medium, a receiver including a beam forming transducer array having spaced transducer elements connected with respective signal channels, amplifier means fed from said signal channels, and connected to means for positionally indicating signal reception comprising range time-base means, and beam position indicating means, phase-shift elements having phase-shift characteristics variable as a function of frequency and providing throughout a frequency sweep differential coordinated phase-shifts in each channel respectively, to determine the relative phases of signals arriving at said amplifier means and thus to determine the angular position of a beam formed by said array in relation to a reference axis thereof, each of said channels including between said transducer elements and said phase-shift elements two phase-shift networks providing quadrature phase-shift as between the carriers of signals passing through said networks, and modulator circuits having inlets connected to these phase-shift networks respectively, a frequency swept local oscillator providing output components of swept frequency in quadrature with each other and connected to said modulator circuits to feed said components thereto respectively, amplitude control means regulating the amplitude of said output components and comprising variable gain amplifier means connected with said range time base means to receive therefrom a signal reducing the gain as a function of range, said modulator circuits being connected to each other at their exits and adapted to provide at least predominantly only a difference frequency between the frequency of said carrier and the frequency of said components of local oscillator output, said local oscillator including means for producing sweep of its frequency within a time interval equal to the duration of each of said emitted pulses and repeated a plurality of times within each pulse repetition period, whereby the phase-shift elements fed with said difference frequency are effective to swing said beam through a sector of said target containing medium in said time interval and for a corresponding number of times within each pulse repetition period, and means coordinating operation of said frequency sweep producing means with operation of said beam position indicating means to provide instantaneous and concurrent position determination of small sized targets in said sector.

17. Apparatus for acoustic position finding comprising a transmitter including means for emitting a series of time-spaced sound pulses of short duration and inherently high range discrimination through a target containing medium, a receiver including a beam forming transducer array having spaced transducer elements connected with respective signal channels, amplifier means fed from said signal channels, and connected to means for positionally indicating signal reception comprising range time-base means, and beam position indicating means, phase-shift elements having phase-shift characteristics variable as a function of frequency and connected in series with each other and to said channels at junctions between said phase-shift elements, and connected at one end of said series at least with said amplifier means, modulator means in said channels between said transducer elements and said phase-shift elements, local oscillator means connected with said modulator means and including means for varying the frequency of at least one local signal output therefrom within a time interval equal to the duration of each of said emitted pulses and repeated a plurality of times within each pulse repetition period, said modulator means including means for selectively feeding a single side band of the resultant modulated carrier of the signal passing through each of said channels to the phase-shift element junctions, whereby the phase-shift elements serve to swing said beam through a sector of said target containing medium in said time interval and for a corresponding number of times within each pulse repetition period, and means coordinating frequency variation of said local signal with operation of said beam position indicating means to provide instantaneous and concurrent position determination of small sized targets in said sector.

18. Apparatus for acoustic position finding comprising a transmitter including means for emitting a series of time-spaced sound pulses of short duration and inherently high range discrimination through a target containing medium, a receiver including a beam forming transducer array having spaced transducer elements connected with respective signal channels, amplifier means fed from said signal channels, and connected to means for positionally indicating signal reception comprising range time-base means, and beam position indicating means, phase-shift elements having phase-shift characteristics variable as a function of frequency and providing throughout a frequency sweep differential coordinated phase-shifts in each channel respectively, to determine the relative phases of signals arriving at said amplifier means and thus to determine the angular position of a beam formed by said array in relation to a reference axis thereof, each of said channels including a first modulator circuit having its inlet connected to the transducer element of the channel, filter means connected to its exit for passing a single side band of a modulated carrier in the channel, a second modulator circuit having its inlet connected to the exit of said filter means and its exit connected to the phase-shift element of the channel, a local fixed frequency oscillator common to all of the first modulator circuits and connected thereto, a local swept frequency oscillator common to all of the second modulator circuits and connected thereto whereby each of the phase-shift elements is fed with a single side band of the carrier modulated in the second modulator circuit, said local swept frequency oscillator including means for producing sweep of its frequency within a time interval equal to the duration of each of said emitted pulses and repeated a plurality of times within each pulse repetition period, whereby the phase-shift elements fed with said single side band of the carrier are effective to swing said beam through a sector of said target containing medium in said time interval and for a corresponding number of times within each pulse repetition period, and means coordinating operation of said frequency sweep producing means with operation of said beam position indicating means to provide instantaneous and concurrent position determination of small sized targets in said sector.

19. Apparatus for acoustic position finding comprising a transmitter, a receiver including a beam forming transducer array having spaced transducer elements connected with respective signal channels, amplifier means fed from said signal channels and connected to means for positionally indicating signal reception comprising range time base means and beam position indicating means, phase-shift elements having phase-shift characteristics variable as a function of frequency and connected in series with each other and to said channels at junctions between said phase-shift elements, and connected at both ends of said series with said amplifier means, modulator means in said channels between said transducer and said phase-shift elements, local oscillator means connected with said modulator means and including means for varying the frequency of at least one local signal output therefrom within a time interval equal to the duration of each of said emitted pulse repeated a plurality of times within each pulse repetition period, said modulator means including means for selectively feeding a single side band of the resultant modulator carrier of the signal passing through each of said channels to the phase-shift element junctions whereby the phase-shift elements serve to swing said beam through a sector of said target containing medium in said time interval and for a corresponding number of times within each pulse repetition period.

20. In a method of position finding comprising emitting a series of time-spaced pulses of wave energy through a target containing medium, receiving said pulses after reflection from a target on a beam-forming array of transducer elements responsive to said wave energy to produce incoming signals, conducting said income signals along respective channels, combining said incoming signals into a resultant signal, and displaying said resultant signal in coordination with positional co-ordinate signals on a display device, the combination of the steps of phase-shifting said incoming signals in said channels by amounts differing from channel to channel along the array to determine instantaneous beam position of said array in relation to a reference axis, and varying the amount of phase-shift in each of the channels through a range of values within a time interval equal to the pulse duration of said emitted pulses, to swing the beam through a sector of said target containing medium within said time interval.

21. In a method of position finding comprising emitting a series of time-spaced pulses of wave energy through a target containing medium, receiving said pulses after reflection from a target on a beam-forming array of transducer elements responsive to said wave energy to produce incoming signals, conducting said incoming signals along respective channels, combining said incoming signals into a resultant signal, and displaying said resultant signal in coordination with positional co-ordinate signals on a display device; the combination of the steps of generating a local oscillatory electrical signal, sweeping the frequency of this signal through a range of values within a time interval equal to the pulse duration of said emitted pulses, heterodyning said incoming signals in said channels with said local signal, and passing a single side band of the resulting modulated signal in the respective channels along electrical paths of respectively differing lengths prior to said combining of said signals, to phase-shift said signals by different amounts each varying throughout said time interval to swing the beam through a sector of said target containing medium within said time interval.

References Cited in the file of this patent

UNITED STATES PATENTS

| | | |
|---|---|---|
| 2,041,600 | Friis | May 19, 1936 |
| 2,247,666 | Potter | July 1, 1941 |
| 2,403,728 | Loughren | July 9, 1946 |
| 2,464,276 | Varian | Mar. 15, 1949 |
| 2,666,191 | Knauss | Jan. 12, 1954 |
| 2,852,772 | Gitzendanner | Sept. 16, 1958 |

FOREIGN PATENTS

| | | |
|---|---|---|
| 119,219 | Australia | Nov. 30, 1944 |